(12) United States Patent
Watanabe

(10) Patent No.: US 12,712,371 B2
(45) Date of Patent: Aug. 18, 2026

(54) SOLID-STATE BATTERY, PROTECTION SYSTEM AND PROTECTION METHOD

(71) Applicant: HONDA MOTOR CO., LTD., Tokyo (JP)

(72) Inventor: Daichi Watanabe, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 747 days.

(21) Appl. No.: 18/123,996

(22) Filed: Mar. 21, 2023

(65) Prior Publication Data

US 2023/0318324 A1 Oct. 5, 2023

(30) Foreign Application Priority Data

Mar. 31, 2022 (JP) ................................ 2022-059069

(51) Int. Cl.

| | |
|---|---|
| ***H02J 7/65*** | (2026.01) |
| ***H01M 10/44*** | (2006.01) |
| ***H01M 10/46*** | (2006.01) |
| ***H01M 10/48*** | (2006.01) |
| ***H02J 7/80*** | (2026.01) |

(52) U.S. Cl.

CPC ............. *H02J 7/65* (2026.01); *H01M 10/443* (2013.01); *H01M 10/46* (2013.01); *H01M 10/486* (2013.01); *H02J 7/80* (2026.01)

(58) Field of Classification Search

CPC ........................................................ H02J 7/80

See application file for complete search history.

(56) References Cited

U.S. PATENT DOCUMENTS

| | | | |
|---|---|---|---|
| 2012/0107665 A1 | 5/2012 | Abe et al. | |
| 2021/0273270 A1* | 9/2021 | Fujikawa | B60L 50/60 |
| 2022/0102822 A1 | 3/2022 | Lee | |

FOREIGN PATENT DOCUMENTS

| | | |
|---|---|---|
| JP | 2017-084647 | 5/2017 |
| JP | 2017-093269 | 5/2017 |
| JP | 2019-106336 | 6/2019 |
| JP | 2022-515429 | 2/2022 |
| WO | 2011/001691 | 1/2011 |

OTHER PUBLICATIONS

Japanese Office Action for Japanese Patent Application No. 2022-059069 mailed Sep. 24, 2025.

* cited by examiner

*Primary Examiner* — Robert Grant

(74) *Attorney, Agent, or Firm* — Amin, Turocy & Watson, LLP

(57) ABSTRACT

A solid-state battery includes a power storage part including a battery cell and configured to flow current to an allowable upper limit value, a current restriction part configured to adjust discharge current of the power storage part under control, and a controller configured to control the current restriction part to flow the discharge current of the power storage part by restricting the current to a first current value or less that is smaller than the allowable upper limit value when a temperature difference of a predetermined value or more occurs between two points of a first point and a second point by measurement results of both the first point and the second point determined on a surface related to the power storage part.

7 Claims, 12 Drawing Sheets

10
30
20
HMI
22
GNSS RECEIVER
24
POWER SUPPLY PART
14
VEHICLE CONTROLLER
16
TRAVELING DRIVING FORCE OUTPUT DEVICE
18
VEHICLE SENSOR
100
SOLID-STATE BATTERY
100
SOLID-STATE BATTERY
12
SOLID-STATE BATTERY CONNECTOR
W
W

FIG. 4

W
T/M
W
18
16
M
22
30
INV
ECU
20
14
24
31
32
12
100
150
160
120
163
162
161
164
LPA
LP
LN
BMU
130
130I
131
132
110
111
112

SOLID-STATE BATTERY, PROTECTION SYSTEM AND PROTECTION METHOD

CROSS-REFERENCE TO RELATED APPLICATION

Priority is claimed on Japanese Patent Application No. 2022-059069, filed Mar. 31, 2022, the content of which is incorporated herein by reference.

BACKGROUND OF THE INVENTION

Field of the Invention

The present invention relates to a solid-state battery, a protection system and a protection method.

Description of Related Art

In recent years, in order to ensure access to affordable, reliable, sustainable and advanced energy for more people, research and development have been carried out on secondary batteries that contribute to energy efficiency. A solid-state battery that is an example of a secondary battery includes a power storage part in which a plurality of battery cells are provided as an assembled battery. A technology of using the temperature measurement result of the battery cell is control of the solid-state battery is known (see Japanese Unexamined Patent Application, First Publication No. 2019-106336). For example, according to Japanese Unexamined Patent Application, First Publication No. 2019-106336, in order to suppress local overcharge and overdischarge of the solid-state battery, the power storage part of the solid-state battery is warmed and regulated on the basis of the temperature of the power storage part in the solid-state battery.

Incidentally, in a situation in which an abnormality of a temperature exceeding an upper limit of an allowable temperature range of the solid-state battery occurs, when the solid-state battery is continuously used, it is difficult to maintain performance of the solid-state battery. A protection system configured to protect the solid-state battery from such a temperature abnormality of a solid-state battery exceeding the upper limit of the allowable temperature range has been desired.

SUMMARY OF THE INVENTION

Incidentally, in the technology related to the secondary battery, no study has been made on a countermeasure method (protection method) for avoiding a temperature abnormality of a solid-state battery on the basis of a measurement result of the solid-state battery. It is difficult to increase the availability of solid-state batteries through countermeasures of suddenly restricting the use of a solid-state battery after detecting a temperature abnormality due to an increase in temperature.

The present application is directed to providing a solid-state battery, a protection system and a protection method that are capable of further increasing availability of a solid-state battery in which an increase in temperature may cause a temperature abnormality. This, by extension, contributes to improvement of energy efficiency.

A solid-state battery, a protection system and a protection method according to the present invention employ the following configurations.

(1) An aspect of the present invention is a solid-state battery (100) including: a power storage part (110) that includes a battery cell and that is configured to flow current up to an allowable upper limit value (Ilim); a current restriction part (160) that is configured to adjust discharge current of the power storage part under control; and a controller (120) that is configured to control the current restriction part to flow discharge current of the power storage part by restricting the current to a first current value (Inew) or less which is smaller than the allowable upper limit value (Ilim) when a temperature difference (ΔT) of a predetermined value or more occurs between two points of a first point and a second point as a measurement result of both the first point and the second point which are determined on a surface related to the power storage part.

(2) In the aspect of the above-mentioned (1), the first current value may be determined within a range in which the temperature difference (ΔT) between the two points does not reach the predetermined value.

(3) In the aspect of the above-mentioned (1) or (2), the controller is configured to restrict the discharge current that flows while being restricted to the first current value (Inew) or less that is smaller than the allowable upper limit value (Ilim), according to the measurement result at both the first point and the second point.

(4) In the aspect of any one of the above-mentioned (1) to (3), the controller restricts the current of the battery cell to a second current value or less that is smaller than the first current value, according to any one of the temperature at the first point and the temperature at the second point gets greater than a predetermined allowable temperature upper limit value.

(5) In the aspect of any one of the above-mentioned (1) to (4), the surface related to the power storage part is a surface included in a battery cell disposed at an end part of the battery cells in a stacking direction.

(6) In the aspect of any one of the above-mentioned (1) to (5), the power storage part (110) further comprises a temperature sensor (131) configured to measure a temperature of the power storage part, wherein the power storage part (110) and the temperature sensor (131) are covered with a protection sheet.

(7) In the aspect of any one of the above-mentioned (1) to (6), a heat conductive member (1140) configured to transfer heat between the two points of the first point and the second point is provided.

(8) An aspect of the present invention is a protection system including: a power storage part that includes a battery cell and that is configured to flow current up to an allowable upper limit value (Ilim); a current restriction part that is configured to adjust discharge current of the power storage part under control; and a controller that is configured to control the current restriction part to flow discharge current of the power storage part by restricting the current to a first current value (Inew) or less which is smaller than the allowable upper limit value (Ilim) when a temperature difference (ΔT) of a predetermined value or more occurs between two points of a first point and a second point as a measurement result of both the first point and the second point which are determined on a surface related to the power storage part.

(9) An aspect of the present invention is a protection method of a solid-state battery comprising a battery cell and a power storage part configured to flow current up to an allowable upper limit value (Ilim), the protection method comprising a step of adjusting discharge current of the power storage part so as to flow the discharge current of the power storage part by restricting the current to a first current value (Inew) or less which is smaller than the allowable upper limit value (Ilim), when a temperature difference (ΔT) of a predetermined value or more occurs between two points of a first point and a second point as a measurement result of both the first point and the second point which are determined on a surface related to the power storage part.

According to the invention of the aspects of the above-mentioned (1) to (9), by providing the solid-state battery including the power storage part that includes the plurality of battery cells and that is configured to flow current up to the allowable upper limit value (Ilim); a current restriction part that is configured to adjust discharge current of the power storage part under control; and the controller that is configured to control the restriction part to flow discharge current of the power storage part by restricting the current to the first current value (Inew) or less which is smaller than the allowable upper limit value (Ilim) when the temperature difference (ΔT) of a predetermined value or more occurs in the measurement results of both the first point and the second point which are determined on a surface related to the power storage part, it is possible further improve availability of the solid-state battery in which a temperature abnormality may occur due to an increase in temperature.

BRIEF DESCRIPTION OF THE DRAWINGS

FIG. 4 is a view for describing an example of a variation in temperature of the embodiment.

DETAILED DESCRIPTION OF THE INVENTION

Hereinafter, embodiments of a solid-state battery, a protection system and a protection method of the present invention will be described with reference to the accompanying drawings. In the following description, the same reference signs designate the same components having the same or similar functions. Further, overlapping description thereof may be omitted.

In the following description, a case in which the solid-state battery of the embodiment is mounted on an electrically driven vehicle will be described. The solid-state battery may be easily detachably disposed on the electrically driven vehicle or may be semi-fixedly attached to the electrically driven vehicle.

Examples of the electrically driven vehicle in the following description may include various vehicles that travel using electric power of a solid-state battery, such as a saddle riding type electrically driven vehicle (hereinafter referred to as "a motorcycle"), a four-wheeled electrically driven vehicle (hereinafter referred to as "an electric vehicle"), or the like. Examples of the vehicle include not only two-wheeled and four-wheeled vehicles, but also all vehicle type moving bodies that travel by an electric motor driven by electric power supplied from a solid-state battery, such as three-wheeled vehicles (including one-front and two-rear wheels, as well as two-front and one-rear wheels), electric assisted bicycles, and the like. However, the moving body to which the solid-state battery of the embodiment is applicable may be, instead of these vehicle type moving bodies, a mobile robot, an autonomous traveling device, an autonomous traveling vehicle, other electrically driven vehicles, a flying object such as a drone (unmanned aircraft) or the like, a moving body such as other electric moving devices (electric mobility) or the like, or may be further configured as a heavy machine used in construction or the like.

First Embodiment

[1. Configuration of Electrically Driven Vehicle]

Figure 1:
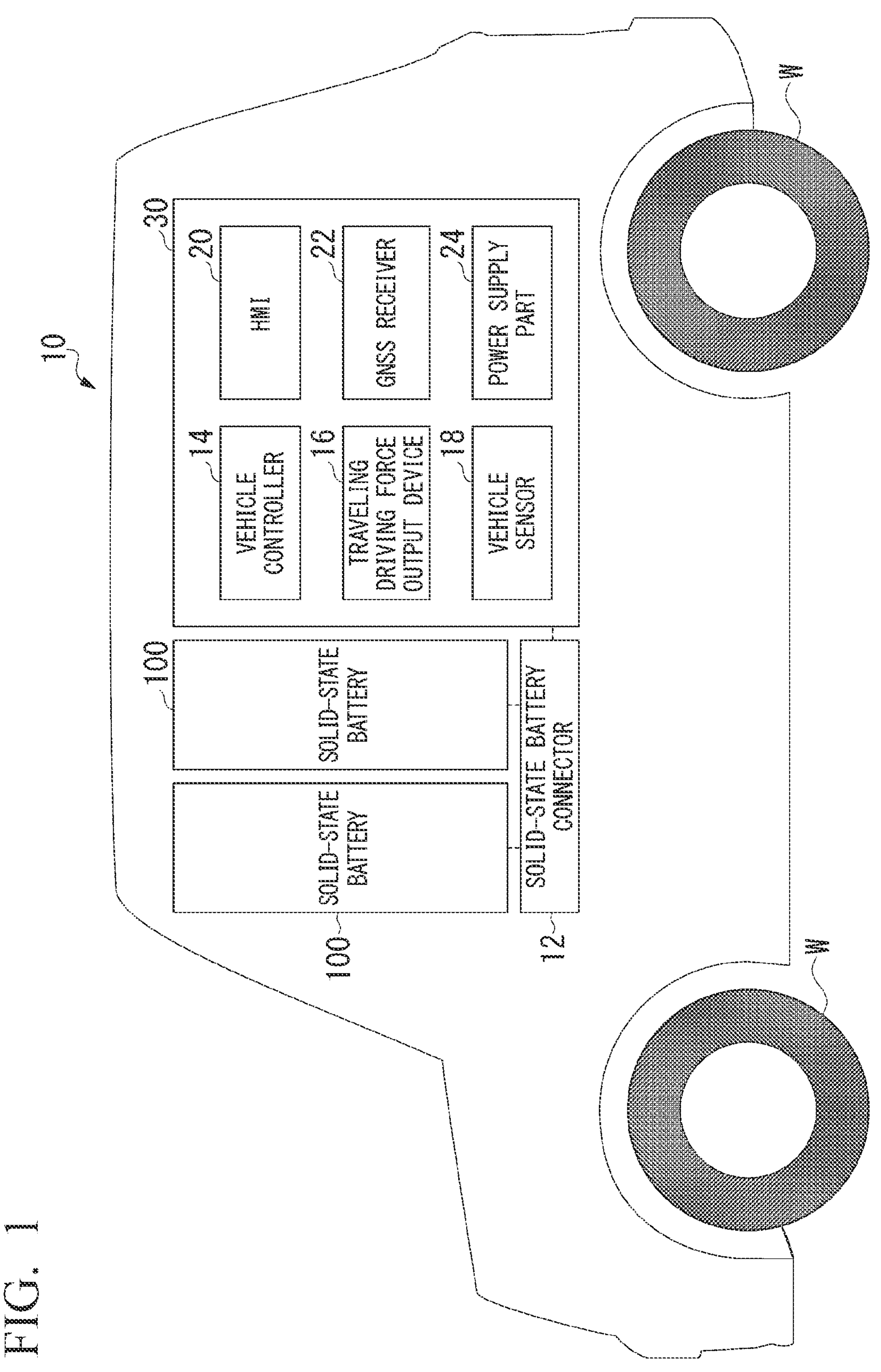
FIG. 1 is a view showing an example of a configuration of an electrically driven vehicle of an embodiment.

FIG. 1 is a view showing an example of a configuration of an electrically driven vehicle 10 of the embodiment. The electrically driven vehicle 10 travels using a driving force of a motor (electric motor) driven by electric power supplied from a solid-state battery 100. However, the electrically driven vehicle 10 may be an electrically driven hybrid vehicle that travels using a driving force by a combination of the solid-state battery 100 and an internal combustion engine such as a diesel engine, a gasoline engine, or the like. The electrically driven vehicle 10 includes, for example, a solid-state battery connector 12, a vehicle controller 14, a traveling driving force output device 16, a vehicle sensor 18, a human machine interface (HMI) 20, a global navigation satellite system (GNSS) receiver 22, and a power supply part 24. The vehicle controller 14 and the traveling driving force output device 16 are an example of a power control unit (PCU).

The solid-state battery connector 12 is electrically connected to the solid-state battery 100 when the solid-state battery 100 is mounted on the electrically driven vehicle 10. The solid-state battery connector 12 includes a connecting terminal of an electric power line configured to receive electric power from the solid-state battery 100, a connecting terminal of a communication line configured to perform data communication between the solid-state battery 100 and the vehicle controller 14, or the like. The solid-state battery connector 12 is connected to a connection part 150 of the solid-state battery 100, which will be described below.

The vehicle controller 14 acquires a measurement result from the vehicle sensor 18, acquires a value expressing a state of charge (SOC) of a power storage part 110 from a battery management unit (BMU) provided in the solid-state battery 100, and acquires a position of the electrically driven vehicle 10 from the GNSS receiver 22. The vehicle controller 14 controls the traveling driving force output device 16 based on the acquired data. The vehicle controller 14 may transmit positional information of the electrically driven vehicle 10 acquired from the GNSS receiver 22 to the solid-state battery 100 via the solid-state battery connector 12.

Figure 8:
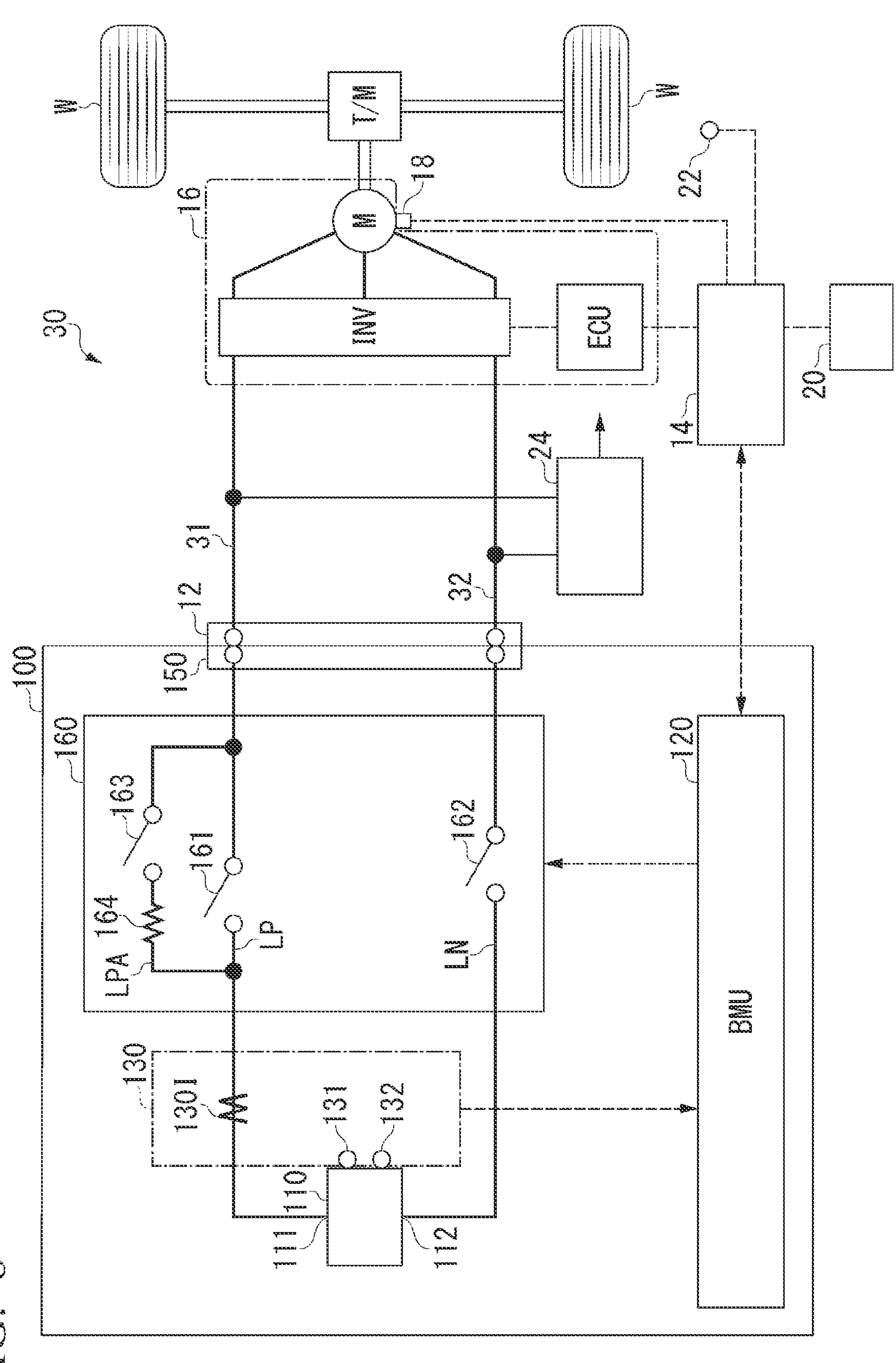
FIG. 8 is a configuration view of a current restriction part and a BMU of the embodiment.

As shown in FIG. 8, which will be described below, the traveling driving force output device 16 includes, for example, an electric motor (M), an inverter (INV), and an electronic control unit (ECU) configured to control the inverter. The ECU controls electric power supplied from the solid-state battery 100 to the electric motor by controlling the inverter according to, for example, a command from the vehicle controller 14. The electric motor (M) drives a wheel (W) via a transmission (T/M) using the output.

The vehicle sensor 18 includes a speed sensor, an acceleration sensor, a rotational speed sensor, an odometer, and other various sensors, mounted on the electrically driven vehicle 10. The vehicle sensor 18 outputs the measurement result to the vehicle controller 14.

The HMI 20 outputs various types of information to a user of the electrically driven vehicle 10 and receives an input operation from the user. The HMI 20 includes various display devices (or touch panels) such as a head up display (HUD), a meter display unit, and the like, and a speaker. In addition to the above, the HMI 20 may include a handle, an accelerator pedal or an accelerator knob, a brake pedal or a brake lever, and a conversion part configured to detect operations thereof. The GNSS receiver 22 determines a position of the electrically driven vehicle 10 based on radio waves coming from a GNSS satellite such as a GPS satellite or the like.

The power supply part 24 generates direct current electric power stepped down from the electric power supplied from the solid-state battery 100 and supplies the electric power to each part.

The solid-state battery connector 12, the vehicle controller 14, the traveling driving force output device 16, the vehicle sensor 18, the HMI 20, the GNSS receiver 22, and the power supply part 24 are an example of an electrical load 30.

[2. Solid-State Battery]

Figure 2:
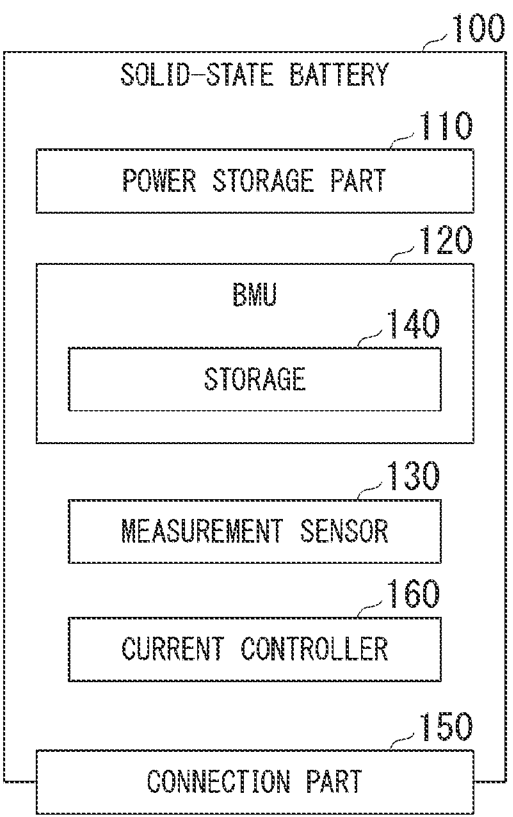
FIG. 2 is a view showing an example of a configuration of a solid-state battery of the embodiment.

FIG. 2 is a view showing an example of a configuration of the solid-state battery 100 of the embodiment. The solid-state battery 100 includes, for example, the power storage part 110, a BMU 120, a measurement sensor 130, a current restriction part 160, and the connection part 150. The BMU 120 includes, for example, a storage 140. The solid-state battery 100 is configured with a protection system 1.

The power storage part 110 is, for example, an assembled battery in which a plurality of battery cells (single cells) are connected in series. Each of the battery cells that constitute the power storage part 110 is, for example, a solid-state battery type secondary battery capable of repeating charge and discharge.

The BMU 120 is configured to include, for example, one or more semiconductor devices such as a processor such as a CPU, an FPGA, or the like, ASIC, a semiconductor memory, and the like. For example, various types of processing by the BMU 120 may be performed by executing a software program using a processor.

The BMU 120 performs control of charge or discharge of the power storage part 110, cell balancing of each of the battery cells, abnormality detection of the power storage part 110, temperature measuring of each battery cell of the power storage part 110, derivation of the estimated temperature, derivation of charge and discharge current of the power storage part 110, estimation of the SOC of the power storage part 110, and the like. The BMU 120 collects the measurement results of the measurement sensor 130, and stores the measurement results and abnormality, malfunction, or the like, of the power storage part 110 estimated on the basis of the measurement result in the storage 140 as the battery state information.

The measurement sensor 130 includes a voltage sensor configured to measure a state of charge of the power storage part 110, a current sensor 1301 (FIG. 8), a temperature sensor, and the like. The measurement sensor 130 outputs the measurement results such as the measured voltage, current, temperature, and the like, to the BMU 120. The measurement sensor 130 is electrically connected to the BMU 120 by, for example, wiring or the like. In the following embodiment, the sensor will be described focusing on the temperature sensor.

The measurement sensor 130 of the embodiment includes a plurality of temperature sensor units. Temperature sensor units 131, 132, . . . 13N (FIG. 3) are examples of the plurality of temperature sensor units.

The plurality of temperature sensor units include the temperature sensor units 131 and 132 disposed at different positions. The temperatures detected by the temperature sensor units 131 and 132 are different from each other because they detect the temperature at each position.

The storage 140 includes a non-volatile storage device such as a flash memory or the like. The storage 140 stores the above-mentioned battery state information. The storage 140 may store various types of variables required for use of the solid-state battery 100, data such as a table or the like used for control, a software program, and the like.

The connection part 150 is electrically connected to the solid-state battery connector 12 of the electrically driven vehicle 10 when the solid-state battery 100 is mounted on the electrically driven vehicle 10. In this state, the solid-state battery 100 supplies the electric power stored in the power storage part 110 to drive the electric motor provided in the electrically driven vehicle 10.

The current restriction part 160 includes a semiconductor element configured to adjust current flowing to the power storage part 110 of the solid-state battery 100. For example, the current restriction part 160 is disposed between the power storage part 110 that is a solid-state battery main body, and an inverter (electric power conversion part) in the traveling driving force output device 16. While the electric power is supplied to the inverter by the discharge from the power storage part 110, the discharge current is adjusted by the current restriction part 160. Further, the electric power from the inverter is supplied to the power storage part 110 and charged in the power storage part 110. The charge current when the solid-state battery 100 is charged may be adjusted by the current restriction part 160.

Restriction of the discharge current includes at least three restriction modes, for example, a first restriction mode of restricting the current to an upper limit value or less corresponding to a rated current value, a second restriction mode of restricting the current within a range by setting a current value smaller than the rated current value as an upper limit, and a third restriction mode of cutting off the current.

A configuration example of the solid-state battery will be described with reference to FIG. 3A and FIG. 3B.

Figure 3A:
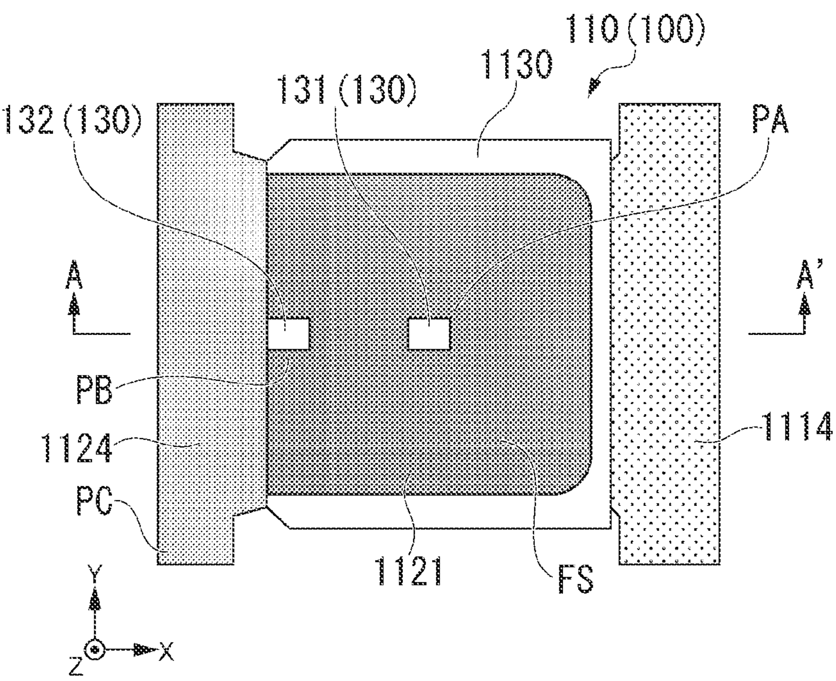
FIG. 3A is a plan view showing a power storage part of the solid-state battery of the embodiment.

FIG. 3A is a plan view showing the power storage part 110 of the solid-state battery 100 of the embodiment. FIG. 3B is a cross-sectional view along line A-A' of the power storage part 110 shown in FIG. 3A.

Figure 3B:
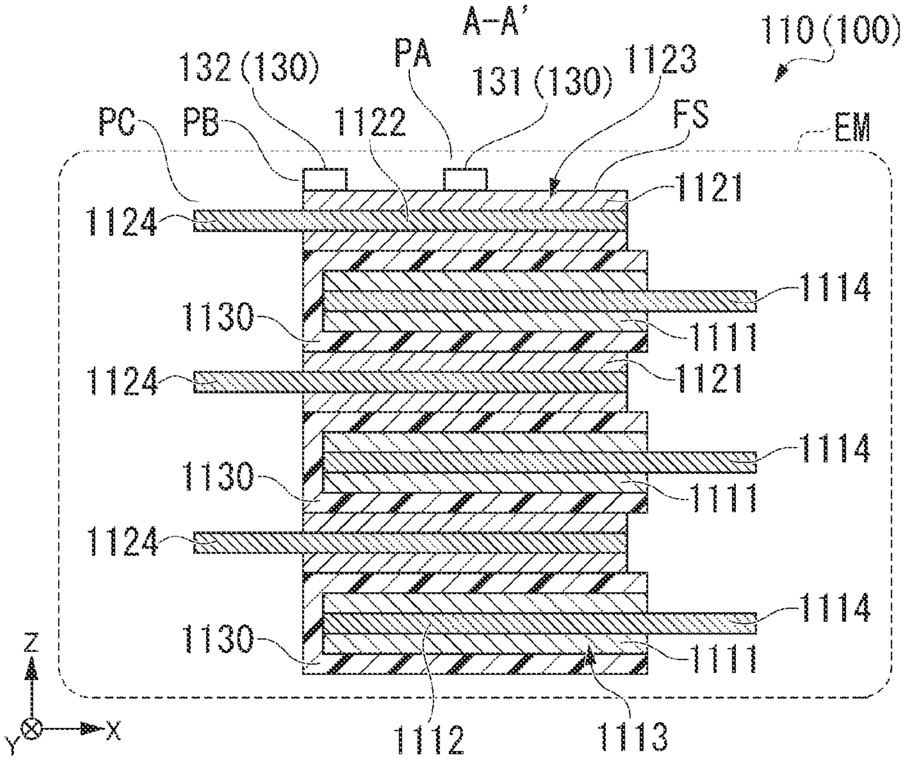
FIG. 3B is a cross-sectional view along line A-A' of the power storage part of the solid-state battery shown in FIG. 3A.

As shown in FIG. 3A and FIG. 3B, the power storage part 110 provided in the solid-state battery 100 of the embodiment has a positive electrode piece 1113, a negative electrode piece 1123, and a solid electrolyte layer 1130. For example, the solid electrolyte layer 1130 is formed in a bag shape to accommodate the positive electrode piece 1113. The shape of the solid electrolyte layer 1130 is not limited thereto. It is sufficient as long as the solid electrolyte layer 1130 has a shape disposed between the positive electrode piece 1113 and the negative electrode piece 1123.

For example, in the power storage part 110, charge and discharge is performed by reception of lithium ions via the solid electrolyte layer 1130 between a positive electrode active material layer 1111 of the positive electrode piece 1113 and a negative electrode active material layer 1121 of the negative electrode piece 1123.

As shown in FIG. 3A and FIG. 3B, the power storage part 110 has a stacked structure, and a protective layer (not shown) may be stacked on the uppermost layer and/or the lowermost layer thereof. The power storage part 110 is accommodated in an exterior member EM formed of a film in a sealed state. A positive electrode 111 (FIG. 8) and a negative electrode 112 (FIG. 8) of the power storage part 110 are exposed from the exterior member EM and used as external terminals. For example, the positive electrode piece 1113, which will be described below, corresponds to the positive electrode 111, and the negative electrode piece 1123, which will be described below, corresponds to the negative electrode 112.

For example, as shown in FIG. 3A and FIG. 3B, the positive electrode piece 1113 has the positive electrode active material layers 1111 formed on both surfaces of a positive electrode current collector layer 1112.

The positive electrode current collector layer 1112 is formed of, for example, a high conductive material such as a metal, alloy, carbon (C), or the like. As the shape of the positive electrode current collector layer 1112, for example, a plate shape, a foil shape, a porous shape (sponge shape), or the like, is exemplified.

The positive electrode active material layer 1111 includes a positive electrode active material that receives lithium ions and electrons. The positive electrode active material layer 1111 contains a positive electrode active material and a solid electrolyte that receives lithium ions. The solid electrolyte contained in the positive electrode active material layer 1111 is not particularly limited as long as it has lithium ion conductivity, and a solid electrolyte material used in the all-solid type lithium ion battery can be generally used. The solid electrolyte contained in the positive electrode active material layer 1111 may exclusively use only one type of material or may use two or more types of materials in combination.

The solid electrolyte contained in the positive electrode active material layer 1111 may be the same as or may be different from the solid electrolyte contained in the negative electrode active material layer 1121 and/or the solid electrolyte layer 1130.

The positive electrode active material layer 1111 may contain a conductive assistant in order to improve conductivity. As the conductive assistant, a known conductive assistant usable in the all-solid type lithium ion battery can be used. As the conductive assistant, only one type of material may be used or two or more types of materials may be used in combination.

In addition, the positive electrode active material layer 1111 may contain positive electrode active materials, and a binder having a role of attaching the positive electrode active materials to the positive electrode current collector layer 1112.

As shown in FIG. 3A and FIG. 3B, the negative electrode piece 1123 has the negative electrode active material layers 1121 formed on both surfaces of a negative electrode current collector layer 1122.

The negative electrode current collector layer 1122 is composed of a high conductive material such as a metal, alloy, carbon (C), or the like. As the shape of the negative electrode current collector layer 1122, for example, a plate shape, a foil shape, a porous shape (sponge shape), or the like, is exemplified.

The negative electrode active material layer 1121 contains a negative electrode active material that receives lithium ions and electrons. When metal lithium, an alloy-based material, or the like, is used as the negative electrode active material layer 1121, the negative electrode active material layer 1121 may be used as the negative electrode current collector layer 1122. In this case, the negative electrode current collector may be used or may not be used. That is, the negative electrode active material layer 1121 may also function as the negative electrode current collector layer 1122.

The negative electrode active material layer 1121 contains a negative electrode active material, and a solid electrolyte that receives lithium ions. The solid electrolyte contained in the negative electrode active material layer 1121 is not particularly limited as long as it has lithium ion conductivity, and a solid electrolyte material used in the all-solid type lithium ion battery can be generally used. The solid electrolyte contained in the negative electrode active material layer 1121 may use a specified material alone or two or more types of materials in combination.

The solid electrolyte contained in the negative electrode active material layer 1121 may be the same as or different from the solid electrolyte contained in the positive electrode active material layer 1111 and/or the solid electrolyte layer 1130. Further, the negative electrode active material layer 1121 may have an intermediate layer. The intermediate layer of the negative electrode active material layer 1121 and the layer adjacent thereto may contain different types of solid electrolytes.

The negative electrode active material layer 1121 may contain a conductive assistant in order to improve conductivity. As the conductive assistant, for example, the same material as that used in the positive electrode active material layer 1111 can be used.

The negative electrode active material layer 1121 may contain negative electrode active materials, and a binder having a role of attaching the negative electrode active materials and the negative electrode active material layer 1121. As the binder, for example, the same material as that used in the positive electrode active material layer 1111 can be used.

The solid electrolyte layer 1130 has a solid electrolyte layer sheet having a porous substrate such as a non-woven fabric or the like, and a solid electrolyte held in the porous substrate. The porous substrate is preferably composed of an insulating material. The solid electrolyte contained in the solid electrolyte layer 1130 may be a material having lithium ion conductivity and insulation, and a known solid electrolyte applicable as the solid electrolyte of the all-solid type lithium ion battery can be used. The solid electrolyte layer sheet may contain an adhesive agent in order to apply mechanical strength and/or flexibility. As the adhesive agent, a known material may be used.

As the solid electrolyte layer sheet used in the solid electrolyte layer 1130, a sheet that does not contain the porous substrate may be used. As such a solid electrolyte layer sheet, for example, a sheet composed of a solid electrolyte and a binding agent (binder) can be exemplified. As the binder, for example, the same material as that used in the positive electrode active material layer 1111 can be used.

A stacked form of the power storage part 110 will be described. For example, as shown in FIG. 3A and FIG. 3B, when the stacking direction of the power storage part 110 is aligned with the Z-axis direction, each of the positive electrode piece 1113, the solid electrolyte layer 1130 and the negative electrode piece 1123 that form a layer are parallel to an X-Y plane perpendicular to the Z axis. In the power storage part 110, a surface of the negative electrode piece 1123 in the +Z-axis direction disposed on the end portion in the +Z-axis direction is referred to as a surface FS.

The power storage part 110 is disposed such that the positive electrode active material layer 1111 and the negative electrode active material layer 1121 face each other via the solid electrolyte layer by alternately stacking the positive electrode piece 1113, the solid electrolyte layer 1130 and the negative electrode piece 1123 so as to overlap each other when seen in a plan view in the Z-axis direction in a plurality of layers (in the embodiment, each three layers).

For example, the number of the stacked layers of the positive electrode piece 1113 and the negative electrode piece 1123 accommodated in the solid electrolyte layer 1130 having a bag shape is one layer or more, can be appropriately determined according to use of the solid-state battery 100, and is not particularly limited.

The battery cell included in the power storage part 110 includes, for example, a set of the positive electrode piece 1113, the solid electrolyte layer 1130, and the negative electrode piece 1123. For example, when the power storage part 110 includes a plurality of battery cells, the battery cells may be connected to each other in series. In addition, the specified battery cell in the power storage part 110 may be connected to the battery cells of the neighboring power storage parts disposed in the X-axis direction or the Y-axis direction.

In the power storage part 110, the temperature sensor units 131 and 132 as the plurality of temperature sensors are disposed to come into contact with the surface FS. The temperature sensor units 131 and 132 detect temperatures of positions where they are disposed, respectively. While the temperature sensor units shown in the drawings are two, they are not limited thereto but may be two or more.

The temperature sensor units 131 and 132 detect temperatures of positions disposed on the surface FS, respectively. A position of a temperature sensor unit 131 on the surface FS is a position relatively close to a center of the surface FS. The position is referred to as a temperature measuring place PA. A position of a temperature sensor unit 132 on the surface FS is a position relatively close to a peripheral portion in the surface FS. The position is referred to as a temperature measuring place PB. The temperature measuring places PA and PB are examples of the plurality of temperature measuring places.

In the following description, for example, it is assumed that the temperature at the position (the temperature measuring place PA) of the temperature sensor unit 131 in the surface FS is lower than the temperature at the position (the temperature measuring place PB) of the temperature sensor unit 132.

Figure 4:
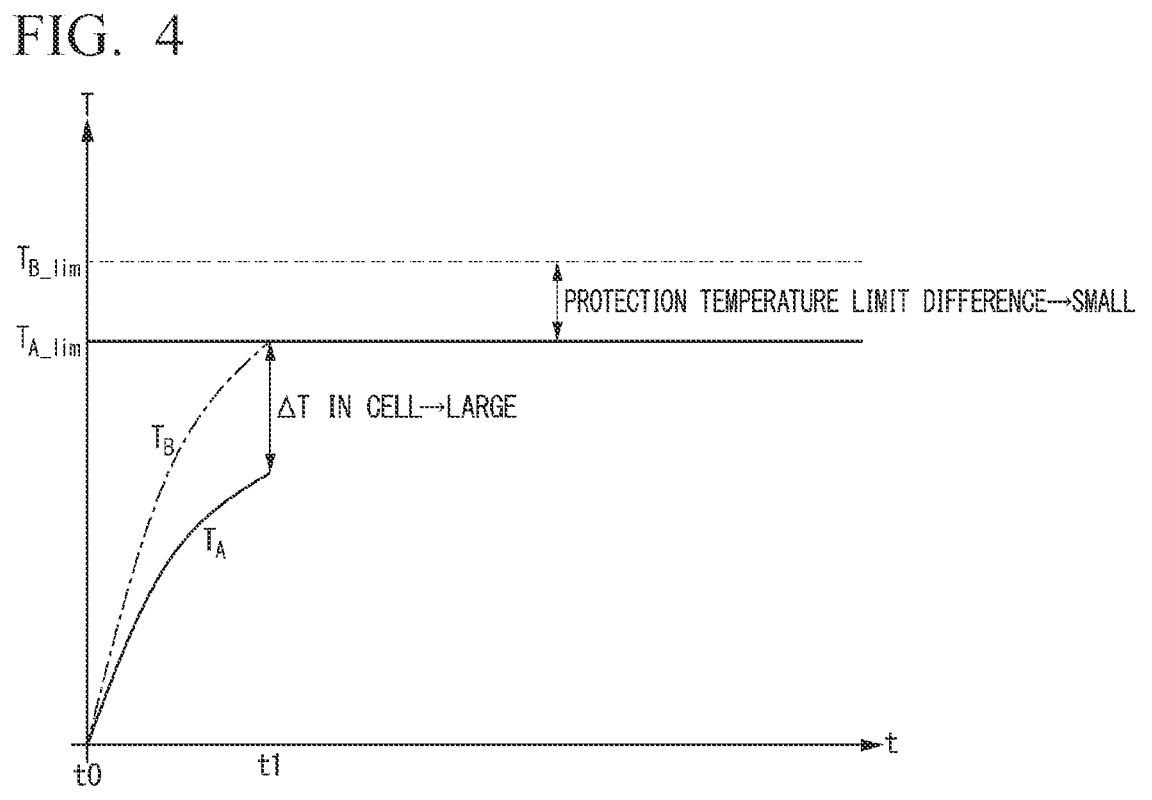

Referring to FIG. 4, an example of a change in temperature will be described.

FIG. 4 is a view for describing an example of a change in temperature of the embodiment. FIG. 4 is a graph showing a change-with-time variation of the temperature. A lateral axis of the graph shows a lapse of time, and a longitudinal axis shows a temperature of the solid-state battery 100 (the power storage part 110).

In the embodiment, as shown in FIG. 3, a plurality of temperature measuring places are provided in the surface FS related to the power storage part 110. TA and TB show measurement results obtained by detecting temperatures of the temperature measuring places PA and PB at different positions. TA_lim and TB_lim shown by the longitudinal axis are examples of upper limit temperatures of a use-allowable temperature range defined by the solid-state battery 100.

For example, TA_lim shows an upper limit temperature (referred to as a battery use upper limit temperature) of an allowable temperature range upon use of the battery at the temperature measuring place. For example, the temperature range relates to a temperature range in which the solid-state battery 100 can be used. The battery use upper limit temperature depends on a type of a material that composes the solid-state battery 100. For this reason, depending on a relation between the type of the material and the temperature required by the usage environment, a suitable configuration and a structure around the battery are determined. Further, the battery use upper limit temperature TA_lim of the solid-state battery 100 may be set to be higher than a battery use upper limit temperature of the liquid phase type lithium ion battery.

TB_lim is an upper limit temperature (referred to as a battery safety guarantee limit temperature) of a temperature range required to secure safety of the solid-state battery 100. The battery safety guarantee limit temperature TB_lim may be determined in consideration of a predetermined security from the temperature at which the material of each part that constitutes the solid-state battery 100 may deteriorate. For example, the battery safety guarantee limit temperature TB_lim is set according to characteristics of a seal member or the like used to seal the exterior member EM. As described above, in the case of the solid-state battery 100, a difference between the battery safety guarantee limit temperature TB_Jim and the battery use upper limit temperature TA_lim may be reduced.

As the measurement results at the two places, a temperature TA at the temperature measuring place PA and a temperature TB at the temperature measuring place PB are shown.

For example, when the use state of the solid-state battery 100 is changed at time t0, the temperatures TA and TB of the temperature measuring places PA and PB start to rise monotonically, respectively. As described in the above-mentioned situation, the temperature TB of the temperature measuring place PB rises faster than the temperature TA of the temperature measuring place PA. At time t1, the temperature TB at the temperature measuring place PB reaches the battery use upper limit temperature TA_lim. The temperature TA at the temperature measuring place PA at that time is in a situation where there is a margin with respect to the battery use upper limit temperature TA_lim. Case 1 of embodiment:

As shown in FIG. 4, in the configuration in which the temperature TB of the temperature measuring place PB tends to be higher than the temperature TA of the temperature measuring place PA, when priority is given to protection from the temperature abnormality, the temperature TB of the temperature measuring place PB may be measured. The temperature abnormality can be detected by detecting that the temperature TB reaches the battery use upper limit temperature TA_lim.

Figure 5A:
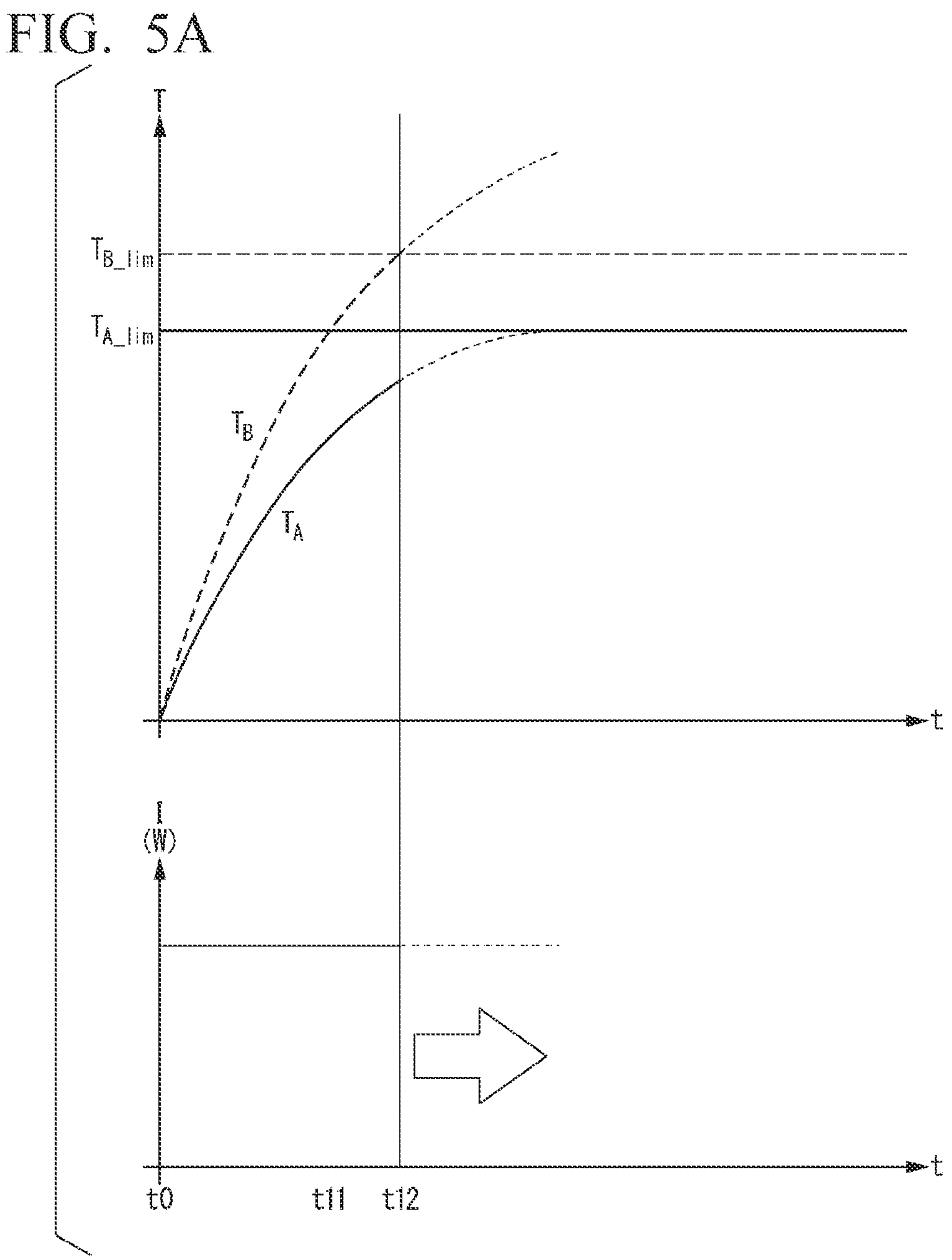
FIG. 5A is a view for describing temperature management in a first comparative example.
Figure 5B:
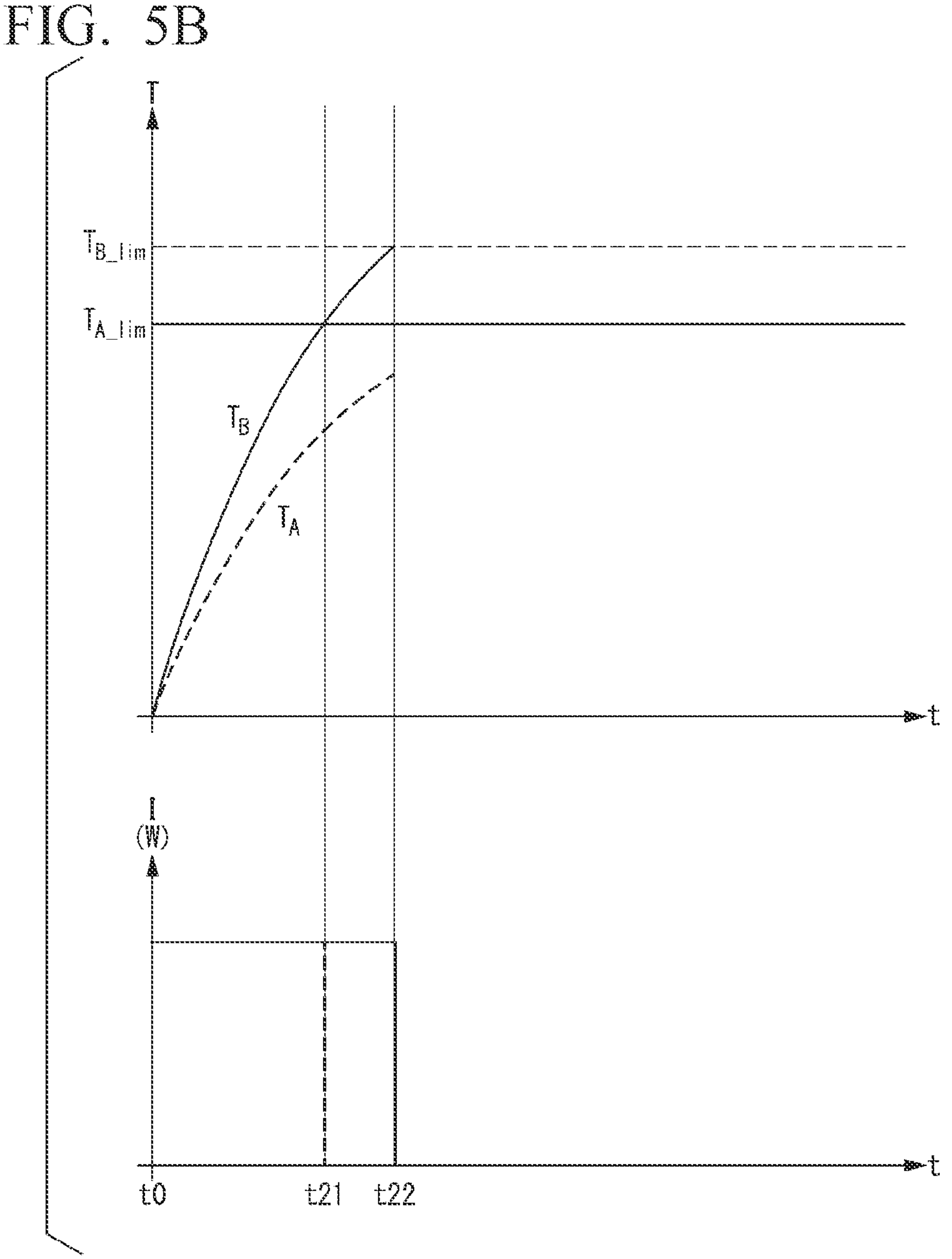
FIG. 5B is a view for describing temperature management in a second comparative example.

Here, before description of "Case 2 of embodiment," a comparative example will be described with reference to FIG. 5A and FIG. 5B. FIG. 5A is a view for describing temperature management in a first comparative example. FIG. 5B is a view for describing temperature management in a second comparative example.

First Comparative Example

FIG. 5A shows a case (first comparative example) in which temperature management is performed using the temperature TA of the temperature measuring place PA on the relatively low temperature side alone. A graph on an upper stage side of FIG. 5A corresponds to FIG. 4, which is described above. A tendency of a change in temperature between the temperature TA of the temperature measuring place PA and the temperature TB of the temperature measuring place PB is the same as in FIG. 4, which is described above. A graph on a lower stage side of FIG. 5A shows a restriction value of the current of the battery.

In this case, even when only the temperature TA of the temperature measuring place PA is observed, the temperature TB of the temperature measuring place PB reaches the battery use upper limit temperature TA_lim at time t11, and further, even when it exceeds this, it may not be detected as the temperature abnormality.

In addition, by observing only the temperature TA of the temperature measuring place PA, the temperature abnormality is not detected because the temperature TA is equal to or lower than the battery use upper limit temperature TA_lim. In addition, it is not detected that the temperature TB of the temperature measuring place PB has reached the battery safety guarantee limit temperature TB_lim at time t12. For this reason, the restriction cannot be applied to stop the discharge. Even when the situation where it exceeds the battery safety guarantee limit temperature TB_lim after the time t12 continues, there was a concern in which a decrease in performance of the solid-state battery 100 may occur.

Second Comparative Example

FIG. 5B shows a case (second comparative example) in which temperature management is performed using the temperature TB of the temperature measuring place PB on a relatively high temperature side alone. A graph on an upper side of FIG. 5B corresponds to FIG. 4 and FIG. 5A, which are described above. A tendency of a change in temperature between the temperature TA at the temperature measuring place PA and the temperature TB at the temperature measuring place PB is the same as in FIG. 4, which is described above. A graph on a lower side of FIG. 5B shows a restriction value of the current of the battery like FIG. 5A.

In this case, even when only the temperature TB at the temperature measuring place PB on the relatively high temperature side is observed, it can be detected that the temperature TB of the temperature measuring place PB has reached the battery use upper limit temperature TA_lim earlier than the temperature TA at the temperature measuring place PA at time t21. According to this, the restriction that interrupts the discharge can be applied. Further, when a temperature rising tendency continues, it is also possible to detect that the temperature TB of the temperature measuring place PB has reached first the battery safety guarantee limit temperature TB_lim (time t22).

When the temperature abnormality is detected for the event of the second comparative example, it is possible to select the timing when discharge from the solid-state battery 100 is restricted as a time that has reached the battery use upper limit temperature TA_lim or as a time that has reached the battery safety guarantee limit temperature TB_lim. In the case of the second comparative example, when the temperature abnormality is detected, the discharge from the solid-state battery 100 is suspended and its use is restricted. Accordingly, heat generation due to internal loss of the solid-state battery 100 can be stopped. Even when the countermeasure is used solely, in response to the detection of the temperature abnormality of the solid-state battery 100, it is possible to suppress deterioration of the performance of the solid-state battery 100, and it is also effective as a countermeasure that emphasizes the safety of the solid-state battery 100. On the other hand, when the temperature abnormality is detected, the electric power stored in the solid-state battery 100 cannot be used. Case 2 of embodiment:

In the embodiment, the temperature management of the solid-state battery 100 is performed using a temperature difference ΔT on the basis of the measurement results at the temperature measuring places PA and PB as described above. In the processing shown below, the countermeasures shown in the first comparative example and the second comparative example are combined with the temperature management method using the temperature difference ΔT.

Processing according to the temperature management of the embodiment will be described with reference to FIG. 6A to FIG. 6C.

Figure 6A:
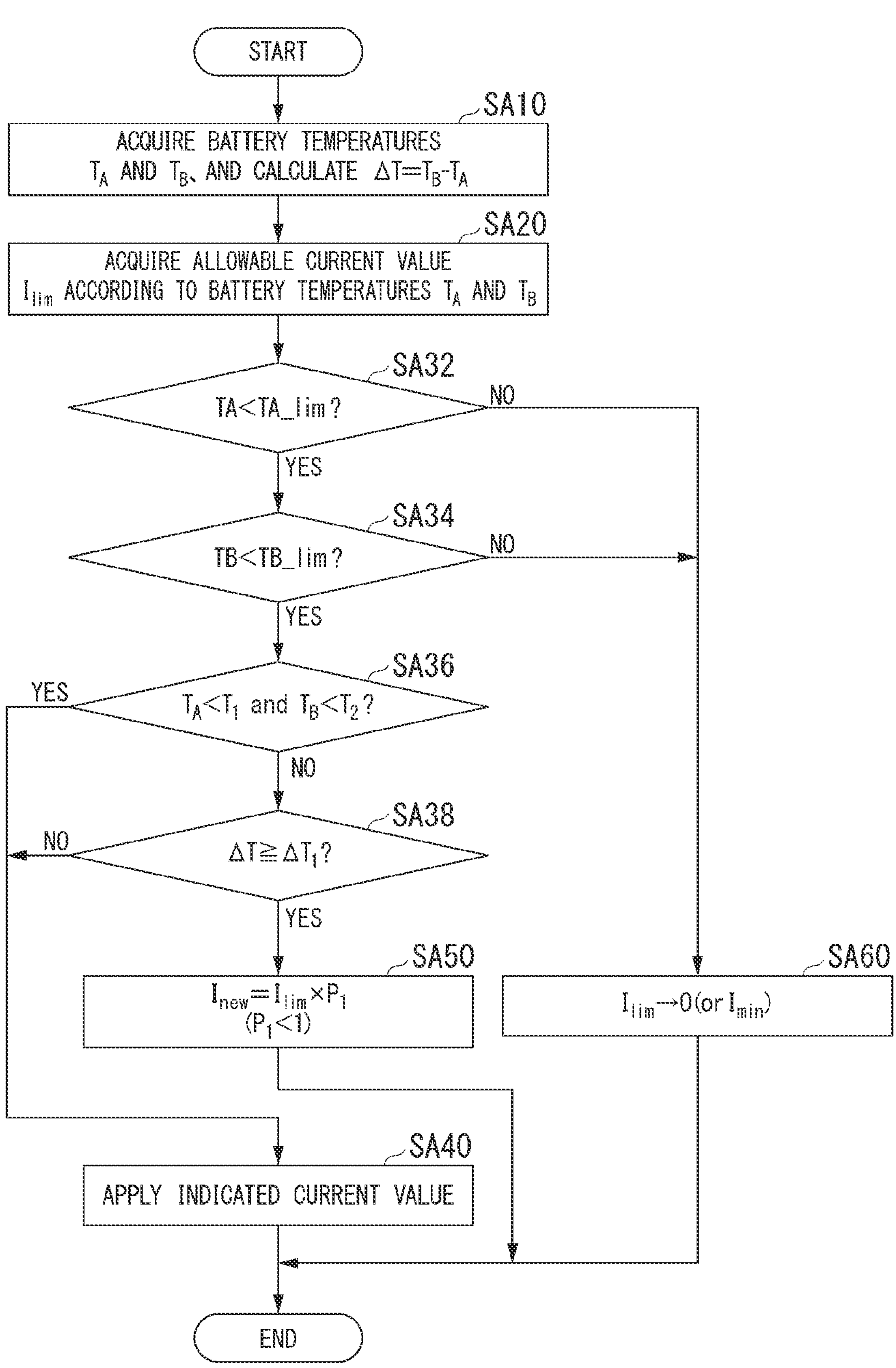
FIG. 6A is a flowchart of processing related to the temperature management of the embodiment.

FIG. 6A is a flowchart of the processing according to the temperature management of the embodiment. FIG. 6B is a flowchart of processing according to temperature management of a first variant of the embodiment. FIG. 6C is a flowchart of processing according to temperature management of a second variant of the embodiment. First, it will be described with reference to FIG. 6A.

As an initial state, the solid-state battery 100 is assumed to be in a state where the SOC that is a charge rate is sufficiently high, and be in a state where it can be discharged by a desired amount of current. A temperature (initial temperature) of the solid-state battery 100 (the power storage part 110) is lower than the battery use upper limit temperature TA_lim.

The BMU 120 acquires the battery temperatures TA and TB of the solid-state battery 100 (the power storage part 110) from the temperature sensor units 131 and 132 and calculates the temperature difference ΔT (step SA10). Any one of the battery temperatures TA and TB of the solid-state battery 100 is a temperature at a position where it is expected to tend to be relatively high temperature in the predetermined surface FS according to the power storage part 110 in the solid-state battery 100, and the other one will be a temperature at a position where it is expected to tend to be relatively low temperature in the predetermined surface FS. In the following description, it will be given assuming that the battery temperature TB is the temperature on the higher temperature side. The temperature difference ΔT is defined as a relative temperature of the battery temperature TB with reference to the battery temperature TA, for example, as shown in the following equation (1).

$$\Delta T=(TB-TA) \quad (1)$$

Assuming that the battery temperature TB is higher than the battery temperature TA as described above, the temperature difference ΔT is a positive value. Further, when a direction of a temperature gradient cannot be specified in advance, the absolute value on the right side of the equation (1) may be taken and used as the temperature difference ΔT.

The BMU 120 acquires an allowable current value Ilim according to the battery temperatures TA and TB from the storage 140 (step SA20). For example, as the allowable current value Ilim, appropriate values for the battery temperatures TA and TB are determined in advance. The allowable current value Ilim may be stored in the storage 140 as a table.

Next, the BMU 120 identifies a state of the solid-state battery 100 on the basis of the battery temperatures TA and TB of the solid-state battery 100 acquired in step SA10 (step SA32 to step SA38). Hereinafter, the above-mentioned steps will be described in sequence.

For example, the BMU 120 determines whether the battery temperature TA is less than the battery use upper limit temperature TA_lim, which is determined in advance (step SA32). When the determined result is No, the BMU 120 advances the processing to step SA60. The processing of step SA60 may be processing for forcibly interrupting the use of the solid-state battery 100.

When the determined result in the above-mentioned step SA32 is Yes, the BMU 120 advances the processing to the next step SA34.

The BMU 120 determines whether the battery temperature TB expected to be a relatively high temperature is less than the battery safety guarantee limit temperature TB_lim, which is determined in advance (step SA34). When the determined result is No, the BMU 120 advances the processing to step SA60.

When the determined result in the above-mentioned step SA34 is Yes, the BMU 120 advances the processing to the next step SA36.

The BMU 120 determines whether the battery temperature TA is less than a threshold temperature T1 and the battery temperature TB is less than a threshold temperature T2 (step SA36). The threshold temperatures T1 and T2 are determined by design in advance. For example, the threshold temperatures T1 and T2 may be the same value or different values. When the battery temperatures TA and TB are equal to or lower than the threshold temperatures T1 and T2, respectively, it can be assumed that the temperature related to the safety of the solid-state battery 100 has not been reached. Here, processing for stricter temperature management can be omitted without verification by determination processing of stricter temperature management.

Here, when the determined result in step SA36 is Yes, the BMU 120 sets the current of the indicated current value to a state in which the current is applied to a load without performing the current value restriction by the battery temperatures TA and TB (step SA40). Accordingly, the solid-state battery 100 can flow the current of the current value determined (indicated) by the control of the vehicle controller 14 to the traveling driving force output device 16. Accordingly, the processing by the identification result of the state of the solid-state battery 100 is terminated.

When the determination in the above-mentioned step SA36 is No, the BMU 120 determines whether the temperature difference ΔT is equal to or greater than a threshold ΔT1 (step SA38). When the determined result is Yes, the BMU 120 performs current value restriction by the battery temperature, and sets a state in which the current of the current value within the restricted range is applied to a load (step SA50). Accordingly, the solid-state battery 100 can flow the current of the current value determined (indicated) by the control of the vehicle controller 14 at the current value within the restricted range to the traveling driving force output device 16. If the current value determined (indicated) by the control of the vehicle controller 14 exceeds the upper limit value of the restricted range, the BMU 120 flows the current restricted to the upper limit value to a load such as the traveling driving force output device 16 of the like. The current supplied from the solid-state battery to the traveling driving force output device 16 is restricted by such current restriction, and an increase in temperature of the solid-state battery 100 is suppressed by the discharge.

When the determination in the above-mentioned step SA38 is No, the BMU 120 advances the processing to the above-mentioned step SA40.

Incidentally, when the determination of the above-mentioned step SA32 is No or when the determination of the above-mentioned step SA34 is No, the BMU 120 performs the current value restriction due to an increase in battery temperature using the current restriction part 160, and sets a state in which switches (161 to 163, see FIG. 9) in the current restriction part 160 are controlled to cut off the current (step SA60). Accordingly, there is no current supplied from the solid-state battery 100 to the electrical load 30 (FIG. 9), and an increase in temperature of the solid-state battery 100 due to the discharge is suppressed.

Further, in the above-mentioned step SA60, the BMU 120 may set the state of the current restriction part 160 as the state in which the current equal to or smaller than a previously determined lower limit value Imin (second current value) flows, instead of the state of the current restriction part 160.

As described above, the BMU 120 estimates the temperature of the battery cell and the assembled battery, instead of the measuring the temperature of each part one by one, by estimating the state of the solid-state battery 100 on the basis of the temperature difference ΔT.

Figure 6B:
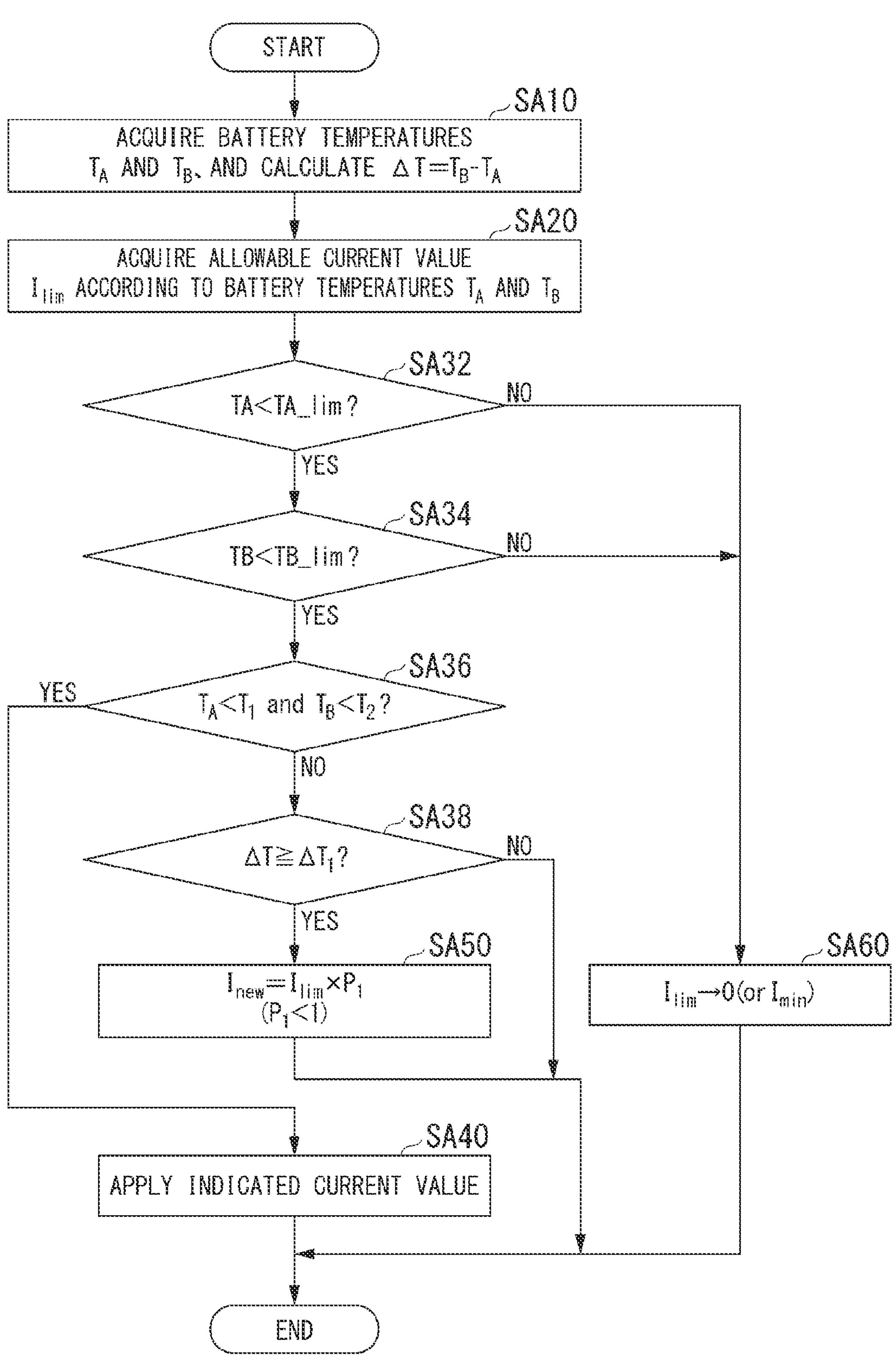
FIG. 6B is a flowchart of processing related to temperature management of a first variant of the embodiment.

FIG. 6B shows a first variant of FIG. 6A. As shown in FIG. 6B, when the determination in step SA38 is No, instead of advance to the above-mentioned step SA40, the BMU 120 may terminate the processing without changing the control state. Other processing shown in FIG. 6B is the same as that in FIG. 6A. According to the procedure shown in FIG. 6B, responsiveness when returning from a temperature abnormality state to a temperature state of a normal range is different from that of the procedure shown in FIG. 6A.

Figure 6C:
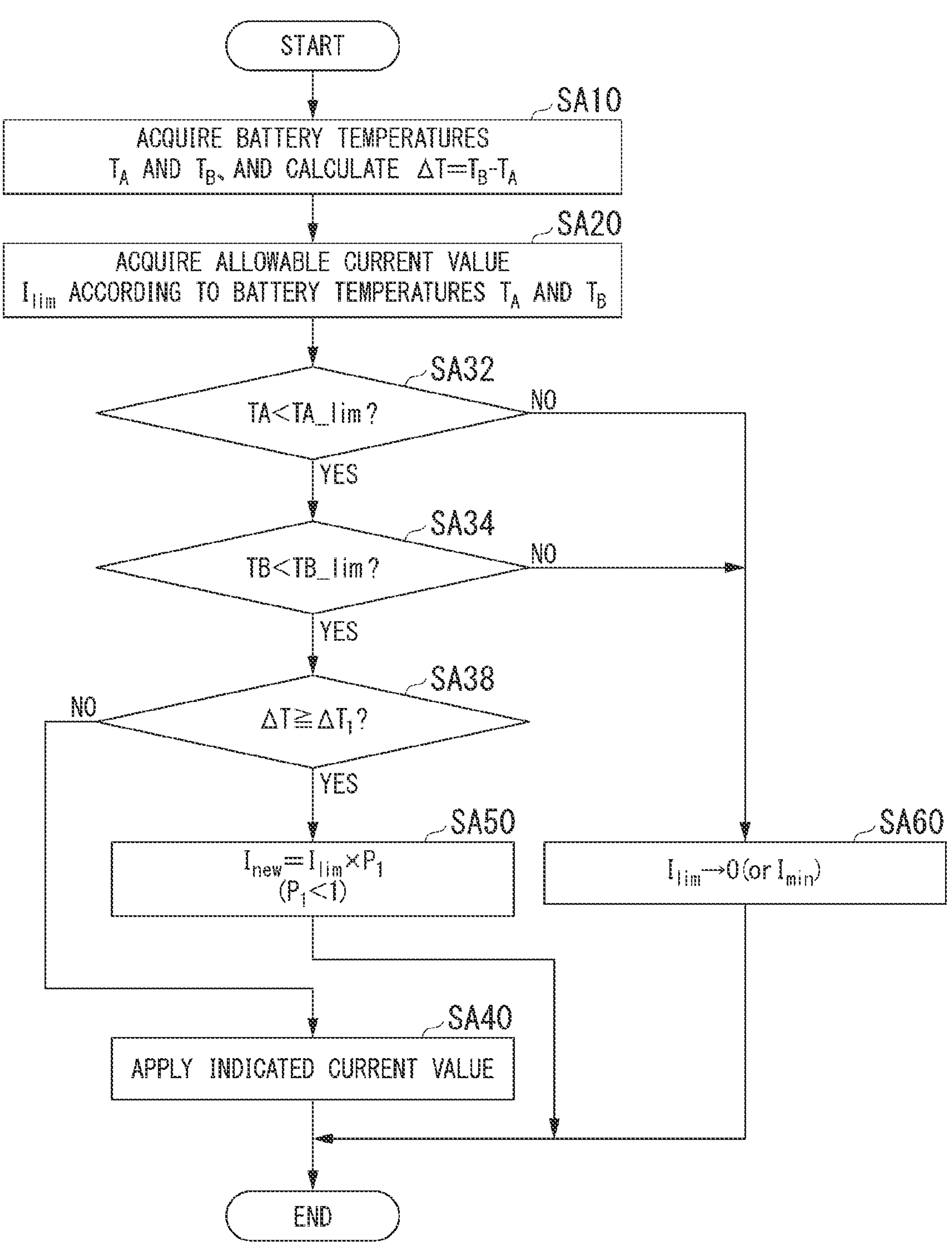
FIG. 6C is a flowchart of processing related to temperature management of a second variant of the embodiment.

FIG. 6C shows a second variant of FIG. 6A. In the procedure shown in FIG. 6C, step SA36 is omitted from the procedure of FIG. 6A. According to the variant, even the measured temperatures TA and TB are relatively low, if the temperature difference ΔT is great, when the durability or the like of the solid-state battery 100 may be affected, the BMU 120 may perform the determination processing in step SA38 while the solid-state battery 100 is in use.

For example, the BMU 120 performs the determination processing of step SA38 when the determined result of the above-mentioned step SA34 is Yes.

The temperature management using the temperature difference ΔT by the processing shown in FIG. 6A to FIG. 6C will be described with reference to FIG. 7.

Figure 7:
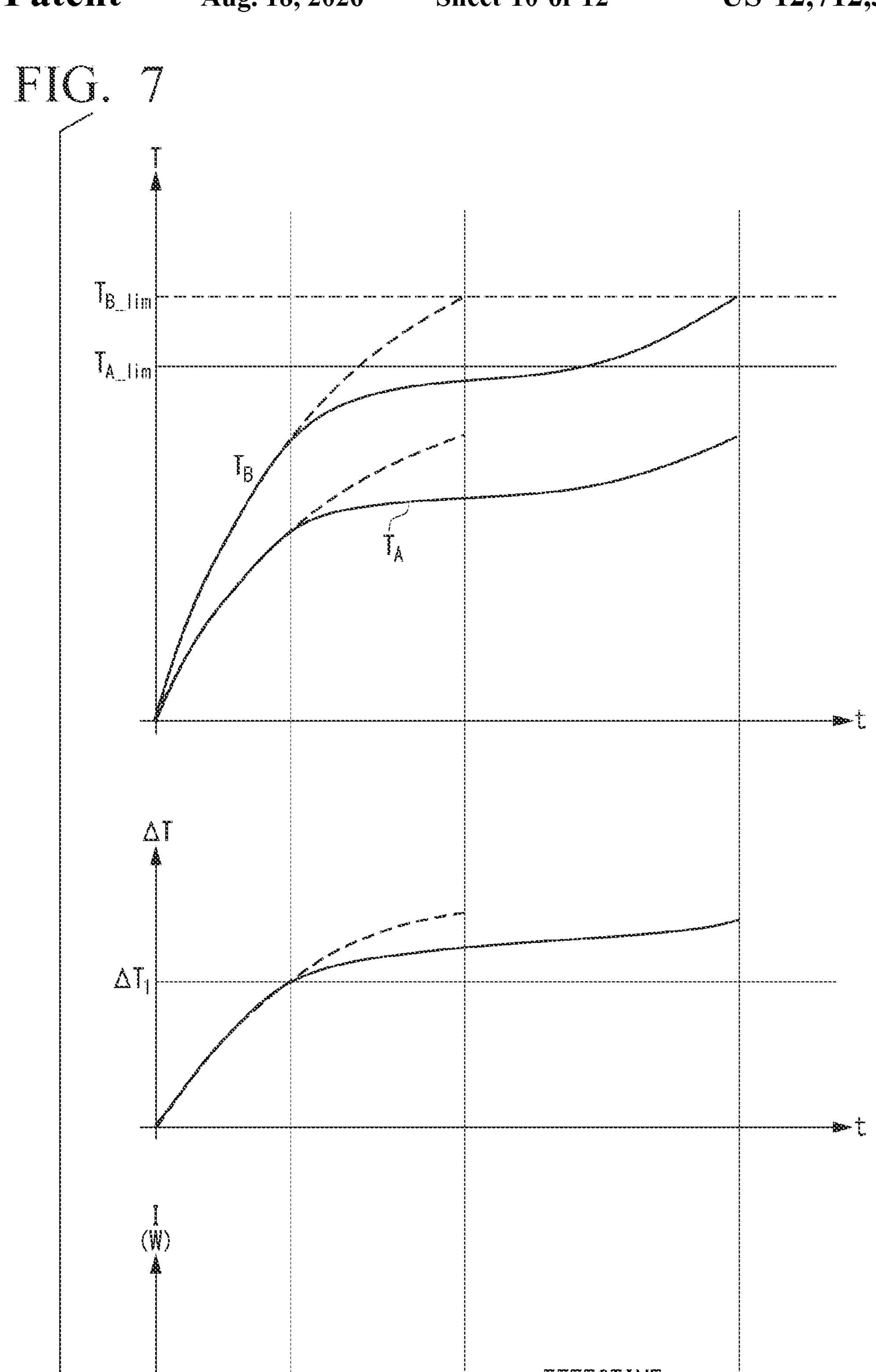
FIG. 7 is a view for describing temperature management using a temperature difference of the embodiment.

FIG. 7 is a view for describing the temperature management using the temperature difference ΔT of the embodiment. FIG. 7 shows a relation between the measurement results of the two places of the embodiment, the temperature difference ΔT thereof, and the restriction value of the current of the battery. A graph on an upper stage side of FIG. 7 corresponds to the above-mentioned FIG. 4. A tendency of a change in temperature of the temperature TA at the temperature measuring place PA and the temperature TB at the temperature measuring place PB is the same as that in the above-mentioned FIG. 4, but the control from the middle of the range shown in FIG. 4 is different. A graph on a middle side of FIG. 7 shows the temperature difference ΔT based on the measurement results of the two temperature measuring places. A graph on a lower side of FIG. 7 shows a restriction value of the current of the solid-state battery 100.

When the BMU 120 starts discharge from the solid-state battery 100 at time t0, the temperatures TA and TB of the temperature measuring places PA and PB are increased monotonically, respectively. As described in the above-mentioned situation, the temperature TB of the temperature measuring place PB is increased faster than the temperature TA of the temperature measuring place PA, and a difference (the temperature difference ΔT) occurs between the temperatures TA and TB.

For example, the temperature difference ΔT reaches the threshold ΔT1 at a stage (time t1A) earlier than time (time t1) when each of the temperature TA at the temperature measuring place PA and the temperature TB at the temperature measuring place PB reaches the battery use upper limit temperature TA_Jim. It is estimated that the state in which the temperature difference ΔT equal to or greater than the predetermined amount occurs is caused by a case in which heat resistance between the temperature measuring place PA and the temperature measuring place PB is great, a case in which a situation where a temperature of a heat source is high occurs, leading to an increase in temperature on a high temperature side, and the like. If this state continues, the temperature of each part may rise further.

The temperature difference ΔT becomes equal to or greater than the threshold ΔT1 at the time t1A. The BMU 120 detects it, and switches the restriction value of the current of the solid-state battery 100 from the allowable current value Ilim to a restriction value Inew smaller than this. A heating value due to loss of the solid-state battery 100 is reduced by restricting the relatively small current and continuing supply of the current in this way. While the rate of change of the temperature TA and the temperature TB after the time t1A remains positive as before the time t1A, the rate of change is reduced after the time t1A.

As a result, since the temperature TB of the temperature measuring place PB does not reach the battery safety guarantee limit temperature TB_lim even at the time t2 shown in the second comparative example (FIG. 5B), the current value is restricted even after the time t2, but a state in which the current output is allowed can be maintained.

After that, at time t4, the temperature TB of the temperature measuring place PB reaches the battery safety guarantee limit temperature TB_lim. At this time, the BMU 120 detects that the temperature TB has reached the battery safety guarantee limit temperature TB_lim, and interrupts the discharge from the solid-state battery 100.

The BMU 120 can supply the electric power from the solid-state battery 100 in a duration from time 2 to time 4 in comparison with the second comparative example (FIG. 5B) by implementing the above-mentioned temperature management. In this duration, while it is not possible to use a relatively large amount of electric power to bring an electric motor M into a high output state, a relatively small amount of electric power can be obtained from the solid-state battery 100.

A relation between the current restriction part 160 and the BMU 120 of the embodiment will be described with reference to FIG. 8.

FIG. 8 is a configuration view of the electrically driven vehicle 10 including the current restriction part 160 and the BMU 120 of the embodiment.

The current restriction part 160 (hereinafter, simply referred to as the current restriction part 160) of the solid-state battery 100 is mounted in the solid-state battery 100 to cut off connection between the power storage part 110 and the electrical load 30. For example, the current restriction part 160 includes a switch 161 to a switch 163, and a current restriction element 164.

The switch 161 is provided on a positive electrode line LP that connects the positive electrode 111 of the power storage part 110 and a power supply line 31 of the electrical load 30 on a positive side, and switches between conduction and cutoff of the positive electrode line LP. For example, the positive electrode line LP is connected to a terminal of the connection part 150. The power supply line 31 is connected to a terminal of the solid-state battery connector 12. The positive electrode line LP and the power supply line 31 are connected via the terminals of the connection part 150 and the solid-state battery connector 12.

The switch 162 is provided on a negative electrode line LN that connects the negative electrode 112 of the power storage part 110 and a power supply line 32 of the electrical load 30 on a negative side, and switches between conduction and cutoff of the negative electrode line LN. For example, the negative electrode line LN is connected to the terminal of the connection part 150. The power supply line 32 is connected to the terminal of the solid-state battery connector 12. The negative electrode line LN and the power supply line 32 are connected via the terminals of the connection part 150 and the solid-state battery connector 12.

The switch 163 is provided on an assistance positive electrode line LPA, which connects the positive electrode 111 of the power storage part 110 and the power supply line 31 of the electrical load 30 on the positive side, together with the current restriction element 164, and switches between conduction and cutoff of the assistance positive electrode line LPA. The switch 163 and the current restriction element 164 are connected to each other in series.

Further, a one-sided circuit may be used depending on the configuration of the system. In this case, for example, it may be configured without the switch 162.

The positive electrode line LP and the assistance positive electrode line LPA are connected to each other in parallel. An impedance of the positive electrode line LP in a state in which the switch 161 is conducted is desirably smaller than an impedance of the assistance positive electrode line LPA in a state in which the switch 163 is conducted. The impedance of the assistance positive electrode line LPA in the state in which the switch 163 is conducted is desirably large enough to restrict the current of the power storage part 110 to a desired value.

The switch 161, the switch 162 and the switch 163 each include a semiconductor element such as MOSFET or the like. The current restriction element 164 is configured to include an impedance circuit such as a resistance element or the like, and has desired impedance.

For example, the BMU 120 independently switches between opening/closing states of the switch 161, the switch 162 and the switch 163 according to a control signal. Accordingly, the opening/closing states of the switch 161, the switch 162 and the switch 163 are switched, respectively, according to the control signal output from the BMU 120. As described above, each of the semiconductor elements of the switch 161, the switch 162 and the switch 163 may be used as a saturated type switch.

Further, characteristics as a constant current circuit may be given by using semiconductor elements of the switch 161 and the switch 163 as a non-saturated type. For example, constant current characteristics of the allowable current value Ilim may be given to the switch 161, and constant current characteristics of the restriction value Inew may be given to the switch 163.

The above-mentioned configuration is formed as a temperature protection circuit of the solid-state battery 100. Further, it is not essential to provide the above-mentioned configuration exclusively as the temperature protection circuit of the solid-state battery 100, and for example, it may also serve as an inrush current suppression circuit for the subsequent allowable load.

Hereinafter, control according to the temperature protection of the solid-state battery 100 of the embodiment will be described.

The BMU 120 provides a state in which the power storage part 110 and the electrical load 30 are connected via the current restriction element 164 for temperature protection of the solid-state battery 100.

The BMU 120 conducts the switch 161 and the switch 162 during normal discharge. Accordingly, the power storage part 110 is connected to the electrical load with relatively small impedance (normal operation mode). Here, the switch 163 may be in a release state.

Incidentally, when a state in which the temperature abnormality of the power storage part 110 is expected during control by the normal operation mode is detected, for example, the BMU 120 sets the switch 161 to an open state, sets the switch 163 to a conduction state, and connects the power storage part 110 and the electrical load 30 via the current restriction element 164. Accordingly, the discharge current from the power storage part 110 is restricted (for example, the above-mentioned second restriction mode).

Further, when the state in which excessive current flows is detected by the current sensor 1301 (FIG. 8) during control by the normal operation mode, the BMU 120 opens the switch 161 and the switch 162, and cuts off the current (for example, the above-mentioned first or third restriction mode). Response characteristics that cut off the excessive current (over-current cutoff characteristics) may be determined on the basis of a known method.

<With Respect to Set Value of Threshold ΔT1 and Restriction Value Inew>

Set values of the threshold ΔT1 and the restriction value Inew will be described.

The set values of the variables (the threshold ΔT1 and the restriction value Inew) used for control may be determined by thermal conductivity or coolability of the solid-state battery 100.

For example, the heating value due to loss of the solid-state battery 100 is reduced by restricting the discharge current to the restriction value Inew or less. Accordingly, the heating value received by the solid-state battery 100 is reduced, and a tendency of an increase in temperature is suppressed.

Further, when the heat radiation related to thermal conductivity and coolability of the solid-state battery 100 and the heating value received by the solid-state battery 100 are balanced, the solid-state battery 100 becomes a state in which there is no change in temperature.

If the heating value received by the solid-state battery 100 is larger than the heat radiation, a temperature rising trend appears. Even in this case, when the rate of increase of the temperature of the solid-state battery 100 is sufficiently small, the timing leading to the temperature abnormality can be delayed.

The restriction value (Inew) of the discharge current may be determined within a range such that the rate of increase of the temperature of the solid-state battery 100 becomes sufficiently reduced.

In addition, when it is expected that the rate of increase of the temperature of the solid-state battery 100 is a positive value and the temperature of the solid-state battery 100 will be increased, the threshold ΔT1 is set such that the temperature of the solid-state battery 100 does not reach the limit temperature within a predetermined time. The limit temperature is the battery use upper limit temperature TA_Jim or the battery safety guarantee limit temperature TB_Jim of the solid-state battery 100.

The threshold ΔT1 in this case relates to detection sensitivity for detecting a state in which temperature abnormality is expected. When the set value of the threshold ΔT1 is reduced, the detection sensitivity is increased, and on the contrary, when the set value of the threshold ΔT1 is increased, the detection sensitivity is decreased. In this way, the set value of the threshold ΔT1 relates to responsiveness of control of switching from the normal operation state to the protected operation state of the solid-state battery 100.

While the above-mentioned description exemplifies the control of switching from the normal operation state to the protected operation state, on the contrary, it also relates to the control of switching from the protected operation state to the normal operation state.

The set value of the threshold ΔT1 relates to the detection sensitivity of detecting a state in which it is expected that the heating value received by the solid-state battery 100 is reduced and there is no problem even if it returns from the protected operation state to the normal operation state. When the set value of the threshold ΔT1 is reduced, the detection sensitivity is decreased, and on the contrary, when the set value of ΔT1 is increased, the detection sensitivity is increased. In this way, the set value of the threshold ΔT1 is related to the responsiveness of the control of switching from the protected operation state to the normal operation state of the solid-state battery 100. Considering the above-mentioned tendency, the set value of the threshold ΔT1 may be determined.

According to the embodiment, the solid-state battery 100 includes the power storage part 110 including battery cells and configured to flow current to the allowable upper limit value (the allowable current value Ilim), and the current restriction part 160 configured to adjust the discharge current of the power storage part 110 according to the control. The BMU 120 (control unit) controls the current restriction part to flow the discharge current of the power storage part 110 by restricting the current to the first current value (the restriction value Inew) or less smaller than the allowable upper limit value (the allowable current value Ilim) when the temperature difference ΔT equal to or greater than the predetermined value occurs between two points of a first point and a second point according to the measurement results of both points of temperature measuring points PA (the first point) and PB (the second point) determined on the surface FS according to the power storage part 110.

According to a first feature, it is possible to provide a solid-state battery, a protection system and a protection method that are capable of further increasing availability of the solid-state battery in which temperature abnormality may occur due to an increase in temperature.

Further, according to the first feature, the solid-state battery 100 in which the temperature abnormality may occur due to the increase in temperature can prevent a change in characteristics due to the temperature abnormality.

According to a second feature, the first current value (the restriction value Inew) is determined within a range in which the temperature difference ΔT between the temperature measuring points PA and PB2 does not reach the predetermined value. Accordingly, even when the discharge current is flowed, an increase in temperature of the solid-state battery 100 can be suppressed. Further, the predetermined value may be determined on the basis of the upper limit value of the temperature difference at which flowing the discharge current is no longer allowed. The predetermined value may be the threshold ΔT1.

According to a third feature, the BMU 120 restricts the discharge current that flows while being restricted to the first current value (the restriction value Inew) or less smaller than the allowable upper limit value (the allowable current value Ilim) according to the measurement results at the temperature measuring points PA and PB2. Accordingly, the discharge current can be flowed on the basis of the measurement results at the temperature measuring points PA and PB2.

According to a fourth feature, the BMU 120 restricts the current of the battery cell to the second current value (Imin) or less smaller than the first current value (the restriction value Inew) according to the fact that any one of the temperature TA at the temperature measuring point PA and the temperature TB at the temperature measuring point PB gets greater than a previously determined allowable temperature upper limit value.

According to a fifth feature, the surface FS according to the power storage part 110 is a surface provided on the battery cell on the end portion of the battery cells in the stacking direction. Accordingly, the control based on the temperature difference ΔT in the surface FS of the battery cell at the end portion of the battery cells in the stacking direction can be performed.

According to a sixth feature, the power storage part 110 and the temperature sensor unit 131 configured to measure a temperature of the power storage part 110 are covered with the exterior member EM (protection sheet). Accordingly, the temperature of the power storage part 110 covered with the exterior member EM can be measured by the temperature sensor unit 131.

Second Embodiment

A case using a heat conductive member will be described as a second embodiment with reference to FIG. 9A and FIG. 9B.

Figure 9A:
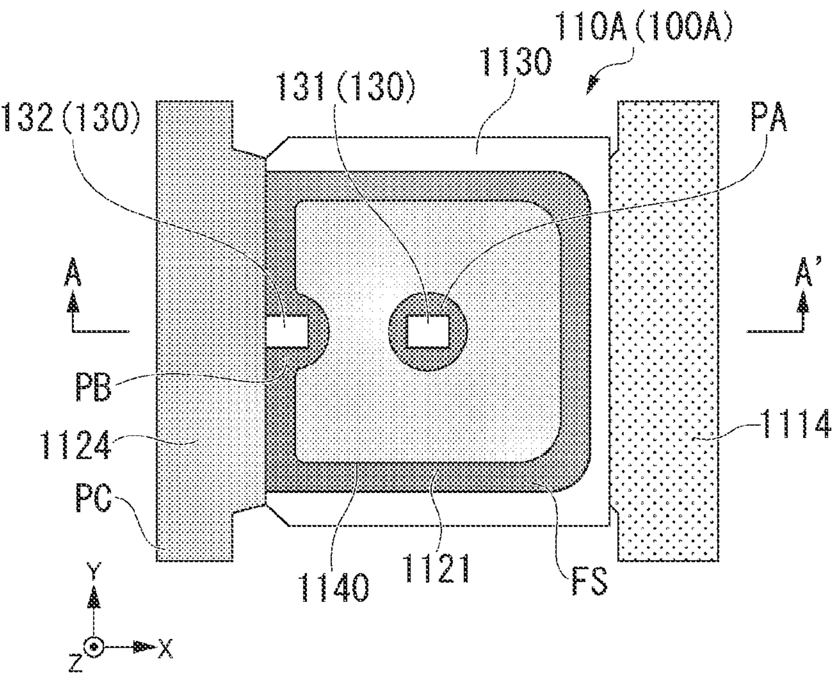
FIG. 9A is a plan view showing the power storage part of the solid-state battery of the embodiment.
Figure 9B:
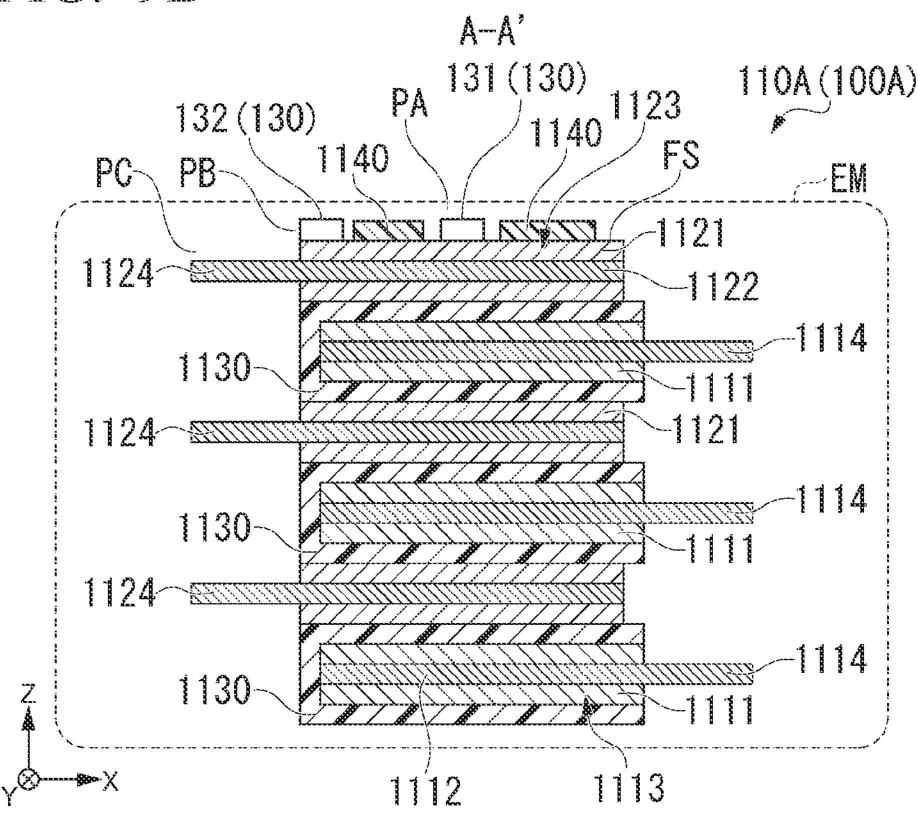
FIG. 9B is a cross-sectional view along line A-A' of the power storage part of the solid-state battery shown in FIG. 9A.

FIG. 9A is a plan view showing a power storage part 110A of the solid-state battery 100 of the embodiment. FIG. 9B is a cross-sectional view along line A-A' of the power storage part 110A shown in FIG. 9A.

The power storage part 110A is provided with a heat conductive member 1140 in addition to the power storage part 110 described above. The heat conductive member 1140 prompts uniformization of a temperature of a solid-state battery 100A (the power storage part 110A).

For example, the heat conductive member 1140 is formed in a sheet shape and disposed to come into contact with the surface FS on the surface FS of the power storage part 110A. The heat conductive member 1140 includes a heat conductive sheet (heat diffusion sheet) configured to carry heat in a surface direction. For example, the heat conductive member 1140 may be a film body by disposing insulating sheets on both surfaces of a metal foil (aluminum foil) and bonding them with an adhesive layer.

The heat is diffused in a direction along the surface FS of the battery cell by disposing the heat conductive member 1140 between the further stacked battery cells. In other words from another viewpoint, the heat conductive member may be provided so as to uniformize the temperature between the two points where the relatively large temperature difference may occur.

The solid-state battery 100 includes the heat conductive member 1140 as described above, and thus, the temperature difference in the surface FS of the power storage part 110A is reduced. Accordingly, the temperature difference ΔT exceeding the threshold ΔT1 is less likely to occur. Accordingly, in order to prevent an influence of temperature unevenness, the frequency of restricting the discharge from the power storage part 110 can be reduced, and availability of the solid-state battery 100 can be increased.

From another viewpoint, organizing the threshold ΔT1, when the set value of the threshold ΔT1 is reduced, while the solid-state battery 100 is easily protected from the temperature abnormality, the duration of the normal operation state tends to be reduced. On the contrary, when the set value of the threshold ΔT1 is increased, while the solid-state battery 100 is more difficult to be protected from the temperature abnormality, the duration of the normal operation state tends to be increased.

For this reason, it may be difficult to provide the set value of the threshold ΔT1 as a proper value. In such a case, thermal conductivity of the solid-state battery 100 may be determined.

For example, as shown in the above-mentioned FIG. 6A (in the case of No in step SA36), current restriction is released at the time when the temperature difference ΔT becomes smaller than a predetermined value ($\Delta T<\Delta T1$).

When the thermal conductivity of the solid-state battery 100 is increased, it is possible to uniformize an in-plane temperature more quickly. Accordingly, the duration in which the solid-state battery 100 is used in a normal state can be extended, and effective utilization thereof becomes possible.

The power storage part 110 in the solid-state battery 100 may be structured such that the high temperature portion is cooled more than the low temperature portion. Using the heat conductive member 1140 as the heat diffusion sheet in the solid-state battery 100 is an example of the above-mentioned structure.

As described above, the solid-state battery 100A can suppress the temperature difference ΔT in the power storage part 110 by providing the heat conductive member 1140 configured to transfer heat between the two points of the temperature measuring point PA and the temperature measuring point PB (seventh feature).

Third Embodiment

A case in which three or more temperature measuring places are provided as a third embodiment will be described.

<Method of Determining Temperature Difference ΔT when Three or More Temperature Measuring Places are Provided>

When the three or more temperature measuring places are provided, the BMU 120 may determine a representative value of the temperature difference ΔT using one of the following method. For example, as the temperature measuring place in this case, the electrode (tab, see PC of FIG. 3A) provided on the battery cell, the target portion required for management in the temperature state, and the like, may be included in the target points of the temperature measuring.

Method of Determining First Temperature Difference $\Delta T$:

The BMU 120 derives a representative temperature based on the temperatures at the plurality of temperature measuring points (referred to as a plurality of points) classified on the high temperature side, and derives the temperature difference $\Delta T$ between the representative temperature on the high temperature side and the temperature at the point classified on the low temperature side.

The representative temperature on the high temperature side may be any one of the highest temperature among the temperatures at the plurality of points, the temperature selected from the plurality of temperatures adjacent to the highest temperature, the temperature (the average temperature, the center temperature, or the like) determined on the basis of the plurality of temperatures adjacent to the highest temperature.

Method of Determining Second Temperature Difference $\Delta T$:

The BMU 120 derives each of the temperature differences $\Delta T_{ij}$ between arbitrary two points among the plurality of points, and derives a larger temperature difference $\Delta T$ from the temperature differences $\Delta T_{ij}$ between the arbitrary two points. The above-mentioned i and j are identifiers for identifying temperature measuring points, respectively. A set of i and j may be defined by a range that targets all the plurality of points, or by a range that is restricted according to a predetermined rule.

The representative value of the temperature difference $\Delta T$ determined on the basis of any of the above-mentioned analysis method may be used as the temperature difference $\Delta T$ of the processing of the first embodiment. According to this, even when the three or more temperature measuring places are provided, the method of the first embodiment can be applied.

Fourth Embodiment

A case in which temperatures of some of temperature measuring places are estimated will be described as a fourth embodiment.

<Analysis Method of Estimating Temperature at Temperature Measuring Place>

Instead of performing the temperature measuring at two points using the two temperature sensor units 131 and 132 like the first embodiment, the BMU 120 may acquire a detected temperature (first temperature) of one temperature sensor unit 131 provided at the first point, and estimate a temperature at the second point (second temperature) using the detected temperature and the temperature estimation model.

The above-mentioned description will be supplemented using the above-mentioned FIG. 3A and FIG. 3B.

The temperature measuring place PB is set as the first point where the temperature sensor is disposed as described above, and the temperature measuring place PA is set as the second point while the temperature sensor is not disposed at the temperature measuring place PA.

For example, the temperature estimation model is configured to relate the temperature TB of the temperature measuring place PB and the temperature TA that is the estimated temperature at the temperature measuring place PA. The above-mentioned relation may be adjusted according to the magnitude of the discharge current. The temperature estimation model may be defined as a conversion table (correlation map) that relates the above-mentioned, or may be defined as a function including input data for analysis such as the temperature TB or the like of the temperature measuring place PB in variables. The temperature estimation model may be configured as a part of an observer that estimates the temperature TA of the temperature measuring place PA. For example, the method disclosed in Japanese Unexamined Patent Application, First Publication No. 2008-276562 may be applied.

For example, data related to the temperature estimation model is stored in the storage 140 of the BMU 120. The BMU 120 may estimate the temperature TA on the basis of the temperature TB of the temperature measuring place PB by successively using the temperature estimation model.

Hereinabove, the preferred embodiments of the present invention have been described. However, the present invention is not limited to the embodiments and may be appropriately changed. According to the above-mentioned embodiments, the same effects as the first embodiment can be exhibited.

According to the example, it is possible to further increase the availability of the solid-state battery in which the temperature abnormality may occur due to an increase in temperature. Then, by extension, it also contributes to energy efficiency.

Hereinabove, while the embodiments and the variants thereof of the present invention have been described, these embodiments and variants thereof are merely proposed and not intended to limit the scope of the present invention. These embodiment and variants thereof may be performed in other various forms, and various omissions, substitutions and modifications may be made without departing from the scope of the present invention. These embodiments and variants thereof are included in the scope of the present invention and included in the present invention disclosed in the claims and the equivalents thereof.

For example, the protection system 1 is not limited to the case in which it is included in the solid-state battery 100. The protection system 1 may be provided in the electrically driven vehicle 10.

Further, each of the above-mentioned devices has a computer therein. Then, a process of each processing of the above-mentioned device is stored in a computer-readable medium in a form of a program, and the processing is performed by reading and executing the program using the computer. Here, the computer-readable medium includes a magnetic disk, a magneto-optical disk, a CD-ROM, a DVD-ROM, a semiconductor memory, and the like. In addition, this computer program may be delivered to a computer via a communication line, and the computer that receives this delivery may execute the program.

In addition, the program may be provided to realize some of the above-mentioned functions.

Further, it may be a so-called difference file (difference program) that can realize the functions described above in combination with a program already recorded in the computer system.

What is claimed is:

1. A solid-state battery comprising:

a power storage part that includes a battery cell and that is configured to flow current up to an allowable upper limit value;

a current restriction part that is configured to adjust discharge current of the power storage part under control;

a controller that is configured to control the current restriction part to flow discharge current of the power storage part by restricting the current to a first current value or less which is smaller than the allowable upper limit value when a temperature difference of a predetermined value or more occurs between two points of a first point and a second point as a measurement result of both the first point and the second point which are determined on a surface related to the power storage part, wherein the surface related to the power storage part is a surface included in a battery cell disposed at an end part of the battery cells in a stacking direction; and a heat conductive member configured to transfer heat between the two points of the first point and the second point.

2. The solid-state battery according to claim 1, wherein the first current value is determined within a range in which the temperature difference between the two points does not reach the predetermined value.

3. The solid-state battery according to claim 1, wherein the controller is configured to restrict the discharge current that flows while being restricted to the first current value or less that is smaller than the allowable upper limit value, according to the measurement result at both the first point and the second point.

4. The solid-state battery according to claim 1, wherein the controller restricts the current of the battery cell to a second current value or less that is smaller than the first current value, according to any one of the temperature at the first point and the temperature at the second point gets greater than a predetermined allowable temperature upper limit value.

5. The solid-state battery according to claim 1, further comprising; a temperature sensor configured to measure a temperature of the power storage part, wherein the power storage part and the temperature sensor are covered with a protection sheet.

6. A protection system comprising:

a power storage part that includes a battery cell and that is configured to flow current up to an allowable upper limit value;

a current restriction part that is configured to adjust discharge current of the power storage part under control;

a controller that is configured to control the current restriction part to flow discharge current of the power storage part by restricting the current to a first current value or less which is smaller than the allowable upper limit value when a temperature difference of a predetermined value or more occurs between two points of a first point and a second point as a measurement result of both the first point and the second point which are determined on a surface related to the power storage part, wherein the surface related to the power storage part is a surface included in a battery cell disposed at an end part of the battery cells in a stacking direction; and a heat conductive member configured to transfer heat between the two points of the first point and the second point.

7. A protection method of a solid-state battery comprising a battery cell and a power storage part configured to flow current up to an allowable upper limit value, the protection method comprising:

adjusting discharge current of the power storage part so as to flow the discharge current of the power storage part by restricting the current to a first current value or less which is smaller than the allowable upper limit value, when a temperature difference of a predetermined value or more occurs between two points of a first point and a second point as a measurement result of both the first point and the second point which are determined on a surface related to the power storage part, wherein the surface related to the power storage part is a surface included in a battery cell disposed at an end part of the battery cells in a stacking direction; and transferring heat between the two points of the first point and the second point by a heat conductive member that is configured to transfer the heat.

* * * * *